United States Patent
Wu

(10) Patent No.: US 11,835,125 B2
(45) Date of Patent: Dec. 5, 2023

(54) GEAR UNIT HAVING A HOUSING

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 1889 days.

(21) Appl. No.: 15/035,085

(22) PCT Filed: Oct. 21, 2014

(86) PCT No.: PCT/EP2014/002831
§ 371 (c)(1),
(2) Date: May 6, 2016

(87) PCT Pub. No.: WO2015/067344
PCT Pub. Date: May 14, 2015

(65) Prior Publication Data
US 2016/0273646 A1    Sep. 22, 2016

(30) Foreign Application Priority Data

Nov. 8, 2013 (DE) ..................... 10 2013 018 713.3

(51) Int. Cl.
*F16H 57/04* (2010.01)
*F16H 57/03* (2012.01)
(Continued)

(52) U.S. Cl.
CPC ....... *F16H 57/0424* (2013.01); *F16H 57/021* (2013.01); *F16H 57/03* (2013.01);
(Continued)

(58) Field of Classification Search
CPC ............. F16H 57/0423; F16H 57/0424; F16H 57/021; F16H 2057/02073; F16H 57/0409; F16H 57/0421; F16H 57/03
See application file for complete search history.

(56) References Cited

U.S. PATENT DOCUMENTS 1,220,810 A * 3/1917 Alquist ............... F16H 57/0447
184/6.12
1,220,811 A * 3/1917 Alquist ............... F16H 57/0447
384/129
(Continued)

FOREIGN PATENT DOCUMENTS

| CN | 201190782 Y | 2/2009 |
|---|---|---|
| CN | 201190784 Y | 2/2009 |

(Continued)

OTHER PUBLICATIONS

Jones, R. (2004). Melbourne Tram Museum. Retrieved Oct. 23, 2020, from http://www.hawthorntramdepot.org.au/papers/groove2.htm (Year: 2004).*

(Continued)

*Primary Examiner* — Joseph Brown
(74) *Attorney, Agent, or Firm* — CARTER, DELUCA & FARRELL LLP

(57) ABSTRACT

A gear unit includes a housing, a trough for guiding oil and reducing losses due to splashing surrounding a circumferential section of a toothing part, particularly a gear wheel, especially in the radial and axial direction, the trough including at least three parts, e.g., at least one bottom plate and two side walls, the bottom plate being screw-connected to the two side walls, the trough being fastened to the housing, the trough having an opening, particularly a channel, especially at its lowest surface area, e.g., particularly at the surface area having the greatest radial distance, in particular, during rotational movement of the gear wheel, oil (Continued)

being conveyed from the oil pan of the gear unit through the opening between the trough and gear wheel, especially to a position higher than the level of the oil pan, the bottom plate and the side walls being stamped bent parts.

30 Claims, 21 Drawing Sheets

(51) Int. Cl.
    *F16H 57/021*     (2012.01)
    *F16H 57/032*     (2012.01)
    *F16H 57/02*     (2012.01)

(52) U.S. Cl.
    CPC ....... *F16H 57/032* (2013.01); *F16H 57/0409* (2013.01); *F16H 57/0423* (2013.01); *F16H 2057/0216* (2013.01); *F16H 2057/02073* (2013.01)

(56) References Cited

U.S. PATENT DOCUMENTS

| | | | | |
|---|---|---|---|---|
| 3,029,661 | A * | 4/1962 | Schmitter | F16H 57/0421 74/606 R |
| 3,785,458 | A * | 1/1974 | Caldwell | B62D 55/125 184/6.12 |
| 4,350,011 | A * | 9/1982 | Rogner | F16D 33/08 184/31 |
| 5,657,672 | A * | 8/1997 | Mochizuki | F16H 57/037 74/606 R |
| 5,799,540 | A * | 9/1998 | Diehl | F16H 63/32 184/11.1 |
| 7,608,005 | B2 * | 10/2009 | Metten | F16H 57/0479 184/6.12 |
| 8,215,470 | B2 * | 7/2012 | Ishikawa | F16D 25/123 192/85.24 |
| 2006/0156861 | A1 | 7/2006 | Yamasaki | F16H 57/0006 74/606 R |
| 2007/0251348 | A1 * | 11/2007 | Hayes | F16H 57/0421 74/606 R |
| 2011/0146437 | A1 | 6/2011 | Schwan et al. | |
| 2011/0224040 | A1 * | 9/2011 | Boissonneault | F16H 57/035 474/146 |
| 2012/0031214 | A1 * | 2/2012 | Strauss | F16H 57/0447 74/467 |
| 2013/0025405 | A1 * | 1/2013 | Arisawa | F16H 57/0495 74/606 R |
| 2013/0090198 | A1 * | 4/2013 | Itoo | F16H 57/03 474/93 |
| 2014/0231209 | A1 | 8/2014 | Nett et al. | |
| 2016/0258525 | A1 * | 9/2016 | Wu | F16H 57/03 |

FOREIGN PATENT DOCUMENTS

| | | | | |
|---|---|---|---|---|
| CN | 201277320 | Y | 7/2009 | |
| CN | 101657656 | A | 2/2010 | |
| CN | 201705903 | U | 1/2011 | |
| CN | 102734446 | A | 10/2012 | |
| CN | 102777574 | A | 11/2012 | |
| CN | 103185125 | A * | 7/2013 | ........... F16H 57/021 |
| CN | 110337773 | A * | 10/2019 | ............... H02K 5/10 |
| CN | 112313432 | A * | 2/2021 | ........... F16H 57/032 |
| DE | 10254572 | A1 | 3/2004 | |
| DE | 102004058635 | A1 * | 6/2006 | ........... B63H 23/02 |
| DE | 102005004739 | A1 * | 8/2006 | ........... F16H 57/028 |
| DE | 10 2008 004 337 | | 10/2008 | |
| DE | 102007020453 | A1 * | 11/2008 | ........... F16H 57/031 |
| DE | 102007020453 | A1 | 11/2008 | |
| DE | 102007021775 | A1 * | 11/2008 | ............. B60K 17/02 |
| JP | 2009-150502 | | 7/2009 | |
| WO | 2010/009871 | | 1/2010 | |
| WO | 2013/045444 | A1 | 4/2013 | |

OTHER PUBLICATIONS

Wikipedia contributors. (Jul. 1, 2013). Strut channel. In Wikipedia, The Free Encyclopedia. Retrieved 15:45, Oct. 23, 2020, from https://en.wikipedia.org/w/index.php?title=Strut_channel&oldid=562336307 (Year: 2013).*
CN 103185125 B (Lin Liangshu) May 4, 2016. [online] [retrieved on Mar. 23, 2022]. Retrieved from: Proquest Dialog. (Year: 2016).*
CN 110337773 B (R Denefleh) Nov. 26, 2021. [online] [retrieved on Mar. 23, 2022]. Retrieved from: Proquest Dialog. (Year: 2021).*
CN 112313432 A (Thorsten Moritz) Feb. 2, 2021. [online] [retrieved on Mar. 23, 2022]. Retrieved from: Proquest Dialog. (Year: 2021).*
DE 102004058635 C9 (Bernard Hunold) Oct. 16, 2014. [online] [retrieved on Mar. 23, 2022]. Retrieved from: Proquest Dialog. (Year: 2014).*
DE 102005004739 A1 (Samir Mahfoudh) Aug. 10, 2006. [online] [retrieved on Mar. 23, 2022]. Retrieved from: Proquest Dialog. (Year: 2006).*
DE 102007021775 A1 (Thomas Freitag) Nov. 13, 2008. [online] [retrieved on Mar. 23, 2022]. Retrieved from: Proquest Dialog. (Year: 2008).*
European Office Action issued from the European Patent Office to corresponding EP Application No. 14792389.0 DATED Nov. 14, 2019.
International Search Report, dated Feb. 13, 2015, issued in corresponding International Application No. PCT/EP2014/002831.
International Preliminary Report on Patentability and Written Opinion, dated May 27, 2016, issued in corresponding International Application No. PCT/EP2014/002831.

* cited by examiner

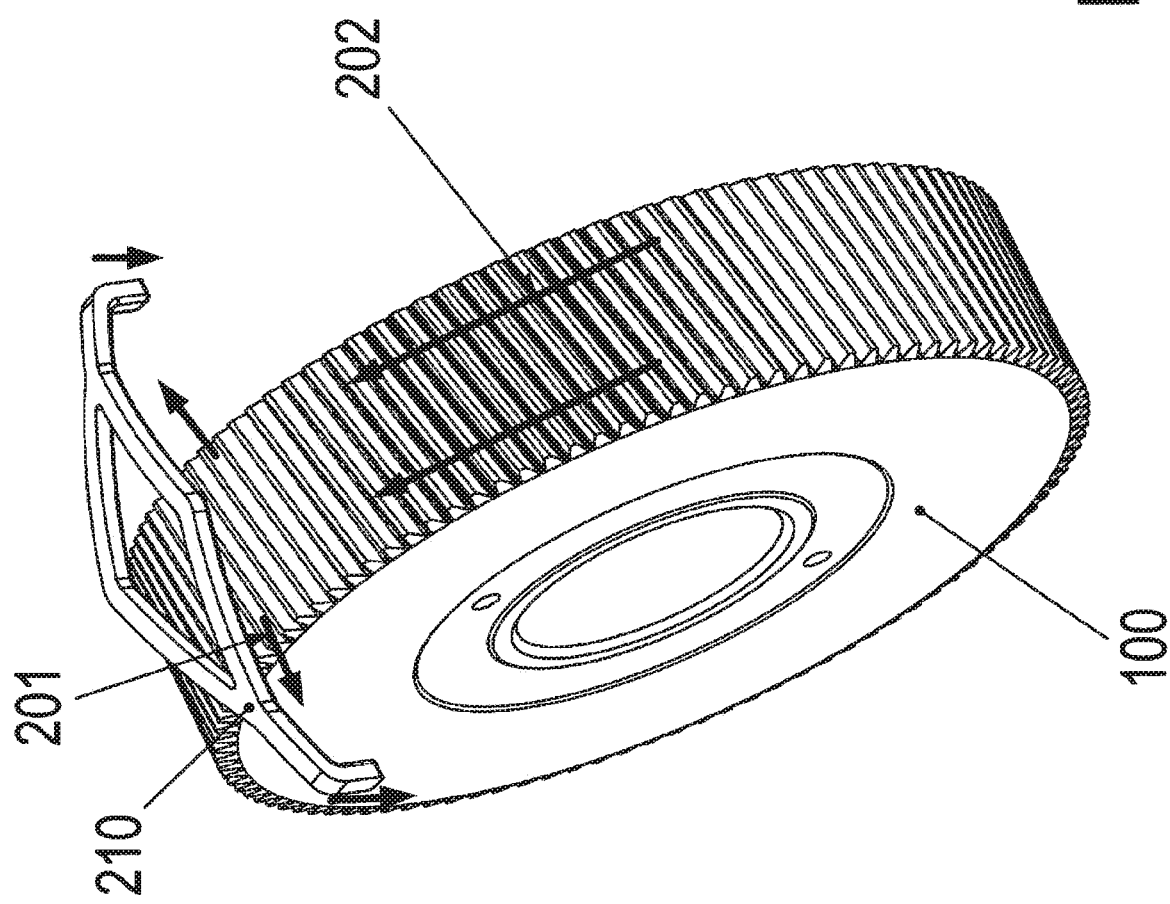

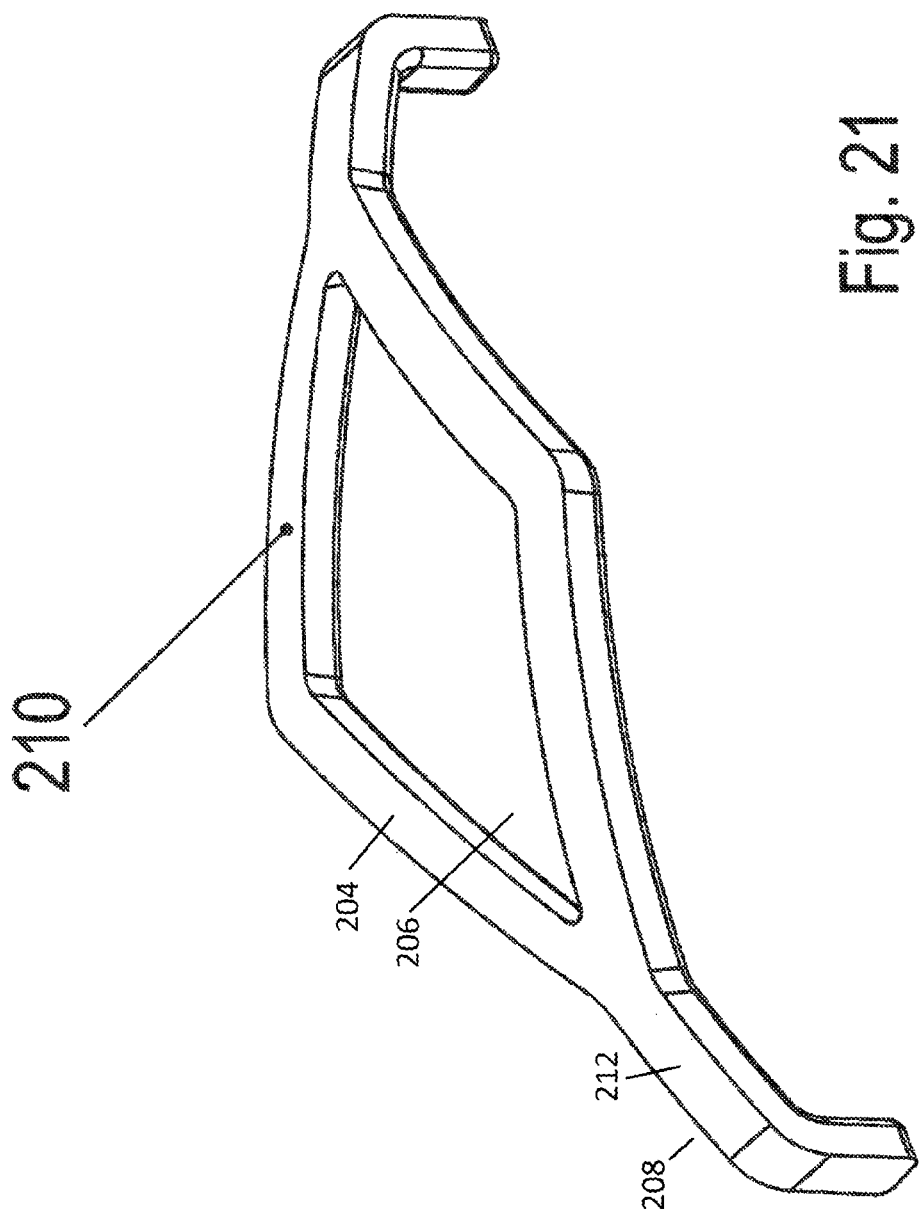

GEAR UNIT HAVING A HOUSING

FIELD OF THE INVENTION

The present invention relates to a gear unit having a housing.

BACKGROUND INFORMATION

It is generally known that a housing of a gear unit has bearing mountings in which the bearings for the shafts of the gear unit are able to be accommodated, and the related forces are dissipated.

SUMMARY

Example embodiments of the present invention provide a gear unit having a housing, which may protect the environment and save resources.

Among features of example embodiments of the present invention with regard to the gear unit having a housing are that the housing has a housing top part and a housing bottom part, the housing having a housing top part and a housing bottom part on which the housing top part is mounted, the housing top part being disposed on a first side of a plane and the housing bottom part being disposed on the other side of the plane, in particular, the housing top part being formed in shell-like fashion, especially like half a nutshell, the housing top part having a top wall at least partially delimiting the interior of the gear unit, at least one oil-guiding rib structure being disposed on the top wall, especially being formed as an elevation or depression, one rib section of the respective oil-guiding rib structure extending from an area of the top wall having slight or vanishing slope—in terms of actual amount—with respect to the plane, especially the horizontal plane, to an area of the top wall having a greater slope with respect to the plane in terms of actual amount.

This is considered advantageous because the oil sprayed up onto the top wall is able to be conducted by the oil-guiding rib structure to laterally disposed grooves. In the process, the oil is guided along the top wall by the oil-guiding rib to the laterally disposed groove.

The respective oil-guiding rib structure may have two or more rib sections that lead into a collector rib section. This offers the advantage that the oil-guiding structure is able to be implemented while saving on material.

The housing top part may have a top wall that at least partially delimits the interior of the gear unit and is curved, especially concave, such that in the longitudinal direction and in the transverse direction, oil droplets sprayed up toward the top wall drip off in or counter to the transverse direction along the top wall into a groove formed on the inner side of the housing top part, in particular, the amount of the gradient of the top wall, e.g., especially the slope of the top wall relative to the horizontal direction, increasing faster in the transverse direction with increasing distance from the highest point of the top wall, especially from the point of the top wall with vanishing gradient, than in the longitudinal direction. An advantage in this case is that the slope and the slope change in the transverse direction are able to be realized such that oil droplets do not drip off, but rather drain off along the oil-guiding rib structure.

The housing top part may have a groove formed on its inner side, especially a groove formed integrally, e.g., in one piece on the housing top part, in particular, the amount of the gradient of the top wall, e.g., especially the slope of the top wall relative to the horizontal direction, increasing faster in the transverse direction with increasing distance from the highest surface point of the top wall, e.g., especially from the surface point of the top wall with vanishing gradient, than in the longitudinal direction. This is considered advantageous because a groove is formed as collection pocket for oil on the housing top part, and thus the oil conveyed in the transverse direction is able to be collected from there and supplied to the bearing positions to be lubricated.

The collector rib section may supply oil to the groove, in particular, the collector rib section of the oil-guiding rib structure extending from an area of the top wall having a first amount of slope with respect to the plane, especially horizontal plane, to an area of the top wall having a second amount of slope with respect to the plane, the second amount being greater than the first amount. An advantage in this instance is that oil is allowed to be conducted in an easy manner, and at the same time, the slope is selectable such that the oil is able to be guided along the top wall, thus, without dripping off.

The top wall may have a plurality of oil-guiding structures. An advantage in this case is that as great a portion as possible of the oil spraying up onto the top wall is able to be drained off to the groove.

The respective oil-guiding structure may be produced as a separate part and joined to the housing top part. This offers the advantage of easy manufacture by forming the oil-guiding structure in the casting mold.

The housing top part may be formed in shell-like fashion, especially like half a nutshell, the housing top part having a top wall that at least partially delimits the interior of the gear unit and is curved, especially concave, such that in the longitudinal direction and in the transverse direction, oil droplets sprayed up toward the top wall drip off in or counter to the transverse direction along the top wall into a groove formed on the inner side of the housing top part, in particular, the amount of the gradient of the top wall, e.g., especially the slope of the top wall relative to the horizontal direction, increasing faster in the transverse direction with increasing distance from the highest point of the top wall, especially from the point of the top wall with vanishing gradient, than in the longitudinal direction.

An advantage in this case is that the top wall is inclined such that oil droplets sprayed by a toothing part, such as a gear wheel, up toward the top wall are drained off to a groove in the housing top part, and from there, are able to be supplied to parts to be lubricated with lubricating oil.

Among features of example embodiments of the present invention with regard to the gear unit having a housing are that the housing has a housing top part and a housing bottom part, in particular, the housing top part being formed in shell-like fashion, especially like half a nutshell, the housing top part having a top wall that at least partially delimits the interior of the gear unit and is curved, especially concave, in the longitudinal direction and in the transverse direction, the housing top part having a groove on its inner side, especially a groove formed integrally, e.g., in one piece on the housing top part, the amount of the gradient of the top wall, e.g., especially the slope of the top wall relative to the horizontal direction, increasing faster in the transverse direction with increasing distance from the highest surface point of the top wall, e.g., especially from the surface point of the top wall with vanishing gradient, than in the longitudinal direction.

An advantage in this case is that the top wall is inclined such that oil droplets sprayed by a toothing part, such as a gear wheel, up toward the top wall are drained off to a groove in the housing top part, and from there, are able to be supplied to parts to be lubricated with lubricating oil.

Preferably, the oil droplets are conveyed along the top wall in or counter to the transverse direction, so that the grooves disposed in and/or counter to the transverse direction are supplied with oil.

The transverse direction may be aligned parallel to the axis of the output shaft, the longitudinal direction being aligned perpendicular to and/or transverse to the transverse direction, in particular, the longitudinal direction being aligned parallel to the plane defined by an axis of an intermediate shaft and an axis of an output shaft.

The top wall may be formed in a manner corresponding to a vault. An advantage in this instance is that the sprayed-up oil droplets are drained off along the vault, in order then to be conducted down along the side into a groove formed on the inner side.

Lubricating oil may be supplied from the groove to parts to be lubricated, such as bearings and/or toothing part. An advantage in this instance is that because oil is sprayed up onto the top wall, the oil is conveyed into the groove. In addition, with the aid of the pumping action of the gear wheel interacting with the trough, lubricating oil is able to be conveyed into the groove, so that sufficient oil is available for lubricating the parts to be lubricated, such as bearings or meshing gear-tooth parts.

A trough for guiding oil and reducing losses due to splashing surrounds a circumferential section of a toothing part, particularly a gear wheel, especially in the radial and axial direction, the trough includes at least three parts, thus e.g., at least one bottom plate and two side walls, the bottom plate being screw-connected to the two side walls, the trough being fastened to the housing, the trough having an opening, particularly a channel, especially at its lowest surface area, e.g., particularly at the surface area having the greatest radial distance, in particular, during rotational movement of the gear wheel, oil being conveyed from the oil pan of the gear unit through the opening between the trough and gear wheel, especially to a position higher than the level of the oil pan, the bottom plate and the side walls being stamped bent parts.

An advantage in this context is that with the aid of the gear wheel, oil is able to be delivered from the oil pan of the gear unit to a higher-situated location such as a temporary storage or a collecting channel, and thus from there, bearings and meshing gear teeth are able to be lubricated with lubricating oil. In addition, with the aid of the trough that, at least sectionally, correspondingly follows the contour of the gear wheel, therefore the outline of the rotating gear wheel, e.g., the cylindrical spatial area that is contacted by the rotating gear wheel, losses due to splashing are able to be reduced. To that end, the gap between the rotating gear wheel and the trough, especially the bottom plate of the trough, must be made small. The bottom plate is situated, with its surface section facing the gear wheel, at a radial distance that is set apart only slightly from the radial distance of the crowns of the gear teeth of the gear wheel to the axis of the gear wheel. Therefore, the surface section of the bottom plate facing the gear wheel extends substantially in the circumferential direction and in the axial direction, but with the exception of an opening, always has the same radial distance to the axis of the gear wheel, especially to the axis of the shaft to which the gear wheel is joined in rotatably fixed fashion.

The construction of the trough from only three parts forming it, namely, bottom plate and side walls, permits an especially cost-effective production by screw-connecting these parts.

The distance, particularly the distance in the radial direction, between the bottom plate and the crowns of the gear teeth is constant in the angle-at-circumference area covered by the trough. This is considered advantageous because a small gap is sufficient as distance in order to achieve the pumping action. Losses due to splashing are therefore able to be reduced.

The bottom plate may include tab sections extending in the radial direction, at which the side walls are screw-connected. An advantage in this case is that the tab sections are able to be produced in an easy manner by bending a punching sheet. In addition, the tab section is able to be aligned parallel to the side wall, e.g., perpendicular to the surface section of the bottom plate extending in the circumferential direction and in the axial direction. Therefore, a simple sturdy connection is attainable between the bottom plate and side wall. In the case of a production series of gear units in which gear wheels of different sizes are used, a transmission ratio that is different in each instance is achievable for each gear unit in the production series. Consequently, however, the bottom plate must be secured at a radial distance adjusted in each case, and thus the axially aligned screws of the screw connection between the bottom plate and side wall at different radial distance, accordingly.

One side wall may have a marking at which a bore hole is able to be placed for leading through a screw of the screw connection. An advantage in this instance is that depending on the transmission ratio of the gear unit or size, especially the crown circle diameter, of the gear wheel, a bore hole is able to be placed at the radial distance indicated differently in each case, and thus the trough is able to be disposed at different radial distance.

The opening, especially the channel, may be bounded by the bottom plate and the two side walls This is considered advantageous because an oil-conveying opening is able to be produced in an inexpensive and uncomplicated manner.

The bottom plate and each side wall may in each instance be formed in one piece, e.g., integrally. This is considered advantageous because each of the three parts is able to be produced as a stamped bent part, e.g., in a very inexpensive and uncomplicated manner. In this context, even the two side walls are able to be similarly implemented.

The housing may be provided for a gear unit, the housing having a housing top part and a housing bottom part, the housing top part having a frame-like support section on which wall sections are molded, the frame-like support section being formed integrally, e.g., in one piece, with the wall sections, particularly as a casting, especially as a steel casting.

An advantage in this case is that only the support section must contain a lot of material, e.g., also mass, but not the wall sections. Therefore, great forces are able to be transmitted, while saving on material.

The greatest wall thickness of the wall sections may be less than the greatest wall thickness of the support section. An advantage in this instance is that the wall sections are able to be implemented with thin wall thickness, making it possible to realize the housing while saving on material.

The frame-like support section of the housing top part may include a first and a second transverse rib, in particular, the transverse ribs stretching mainly in the horizontal direction, e.g., in particular, being extended further in the horizontal direction than in any direction transverse to it, the frame-like support section having two first ribs, the two first ribs being set apart from each other and in each case being joined to the first transverse rib, especially at two points set apart from each other, in particular, the first ribs stretching mainly in the vertical direction, e.g., in particular, being extended further in the vertical direction than in any direction transverse to it, the two second ribs being set apart from each other and in each case being joined to the second transverse rib, especially at two points set apart from each other, in particular, the second ribs stretching mainly in the vertical direction, e.g., in particular, being extended further in the vertical direction than in any direction transverse to it. This is considered advantageous because especially high stability is attainable, accompanied by little expenditure for material. The reason is that the frame-like support section has a rectangular shape, in which the rectangle is bent out of the plane of the rectangle at its two opposite sides, so that the bent areas are located substantially in further planes that are perpendicular to the plane, are set apart from each other, and are parallel to each other.

Each first rib and each second rib may have a lifting eye at its end area facing away from the respective transverse rib. This is considered advantageous because the forces introduced into the housing during transport are introduced directly into the frame-like support section, and not into wall sections having thin wall thickness.

A first rib may be joined at its end area to a bar, especially a support bar, that is joined at its other end to the end area of a second rib, the other rib being joined at its end area to a bar, especially a support bar, that in turn is joined at its other end to the end area of the other second rib, in particular, the two bars being disposed in parallel and set apart from each other. This is considered advantageous because high stability is attainable with the aid of the bracings.

A shaft of the gear unit may be supported by a bearing in the housing, a first part of the bearing mounting being located in the housing top part and a second part of the bearing mounting being located in the housing bottom part, the first part of the bearing mounting being implemented as a thickened section, and being joined to that area of the transverse ribs at which the respective rib is also joined. An advantage in so doing is that an additional bracing of the frame-like support section is provided by the thickened areas.

A housing cover may close an opening in housing top part, the opening being surrounded by the frame-shaped support section, particularly with clearance, especially so that the frame-shaped support section does not directly contact the opening, but rather is set apart from the opening. An advantage in this case is that gear-unit parts are able to be inspected through the opening and maintenance work is able to be carried out. At the same time, no lubricating oil flows out from the gear unit either, since the opening is located on the upper side of the housing top part.

Among features with regard to the gear unit are that it is provided with a housing, a shaft of the gear unit being supported by a bearing in the housing, a first part of the bearing mounting being located in the housing top part and a second part of the bearing mounting being located in the housing bottom part, the first part of the bearing mounting being implemented as a thickened section, and being joined to that area of the transverse ribs at which the respective rib is also joined.

This is considered advantageous because high torsional stiffness and high mechanical stability are attainable.

Example embodiments of the present invention are explained in greater detail below with reference to the Figures.

BRIEF DESCRIPTION OF THE DRAWINGS

As a segment from housing top part 1.

As a segment from housing bottom part 2.

FIG. 20 shows oil-guiding rib structure 210 and a gear wheel 10 spraying the oil up toward oil-guiding rib structure 210.

FIG. 21 shows oil-guiding rib structure 210 separately.

DETAILED DESCRIPTION

Figure 1:
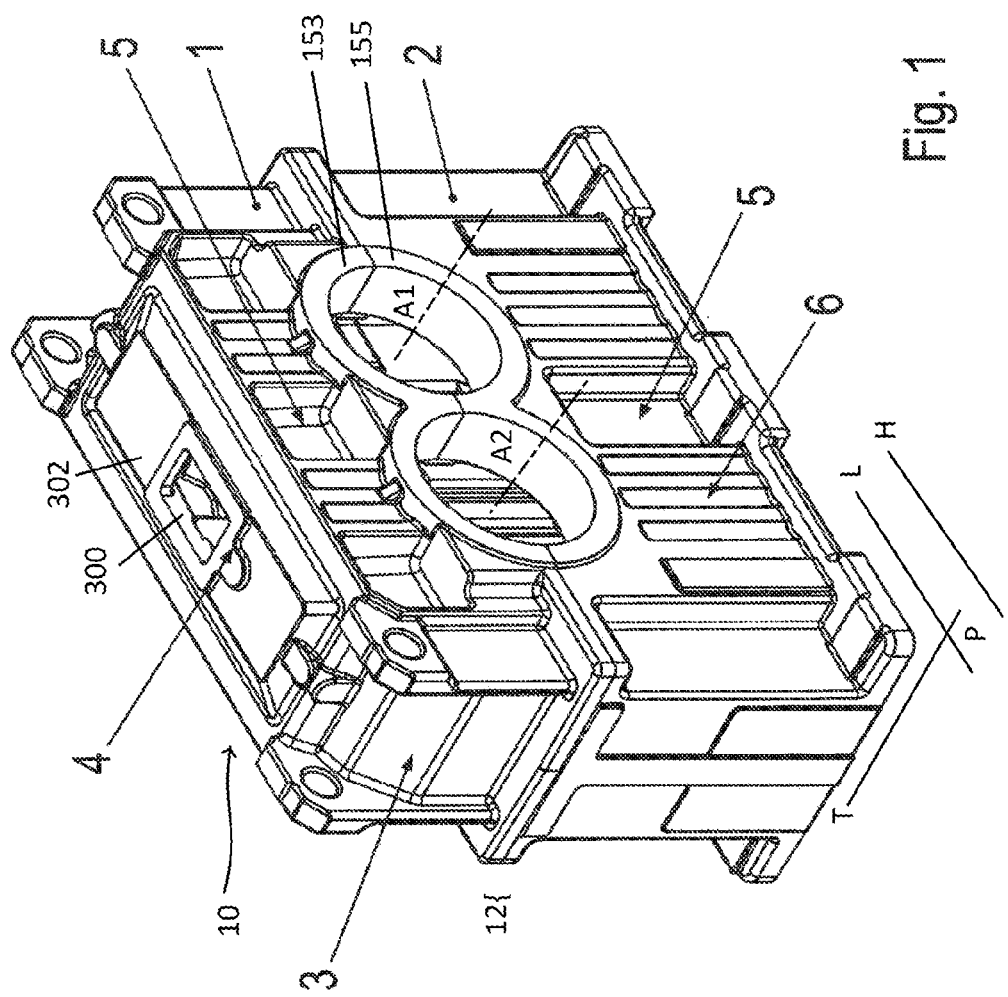
FIG. 1 shows an oblique view of a gear-unit housing according to an example embodiment of the present invention for a gear unit 10 in a first viewing direction, the housing 12 including a housing top part 1 and a housing bottom part 2.
Figure 2:
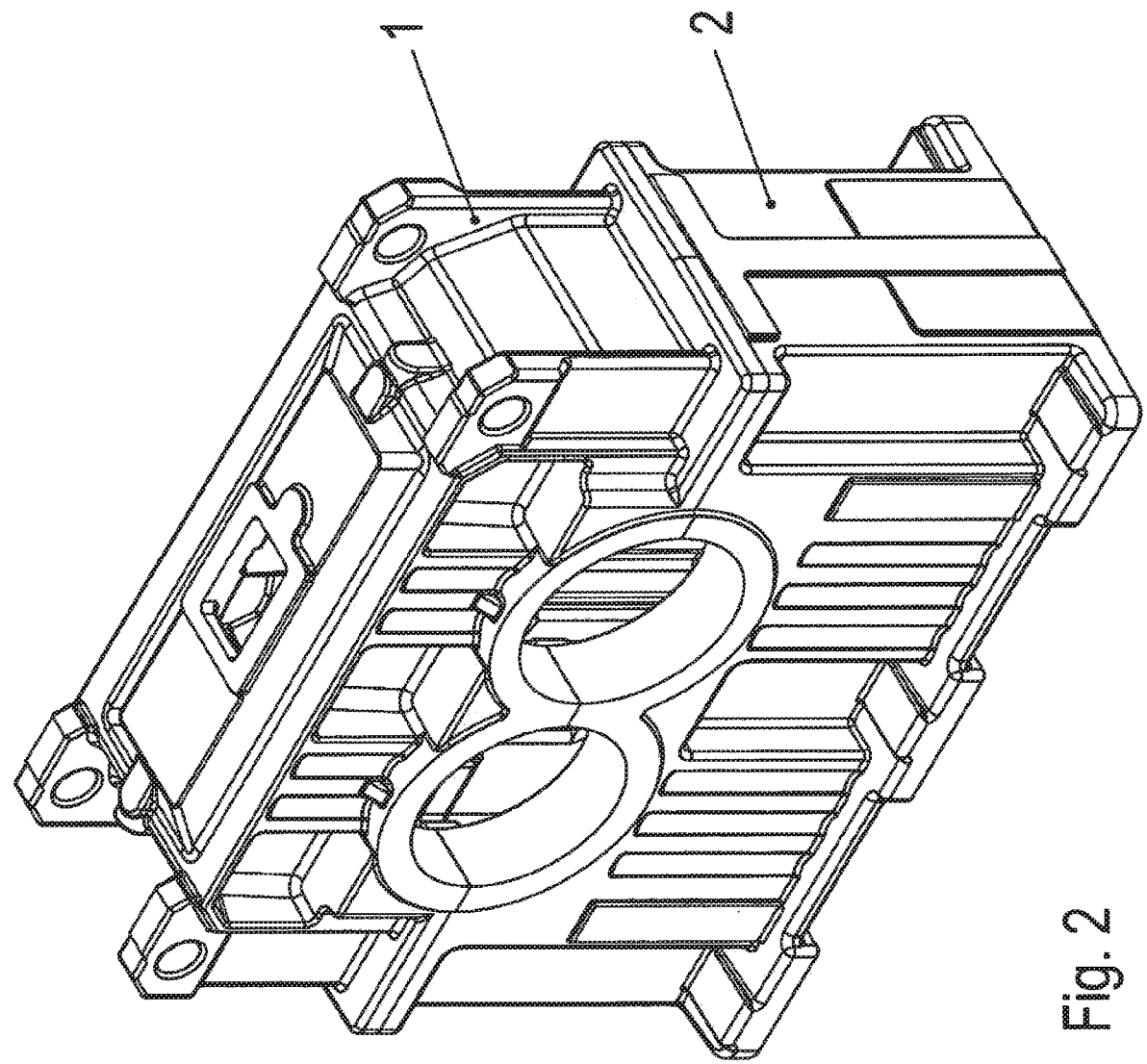
FIG. 2 shows an oblique view of the gear-unit housing in another viewing direction.
Figure 3:
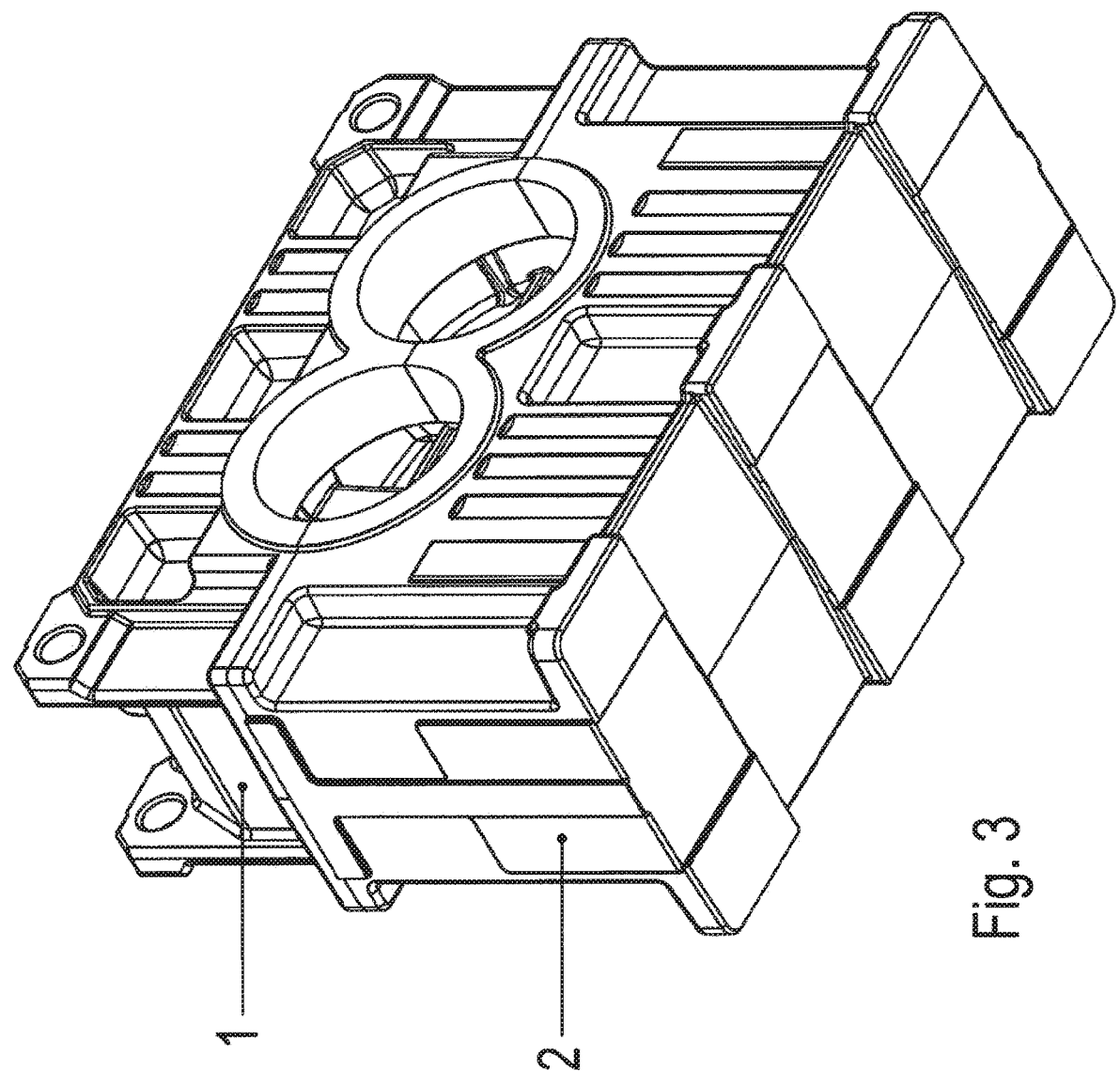
FIG. 3 shows an oblique view of the gear-unit housing in a third viewing direction.
Figure 4:
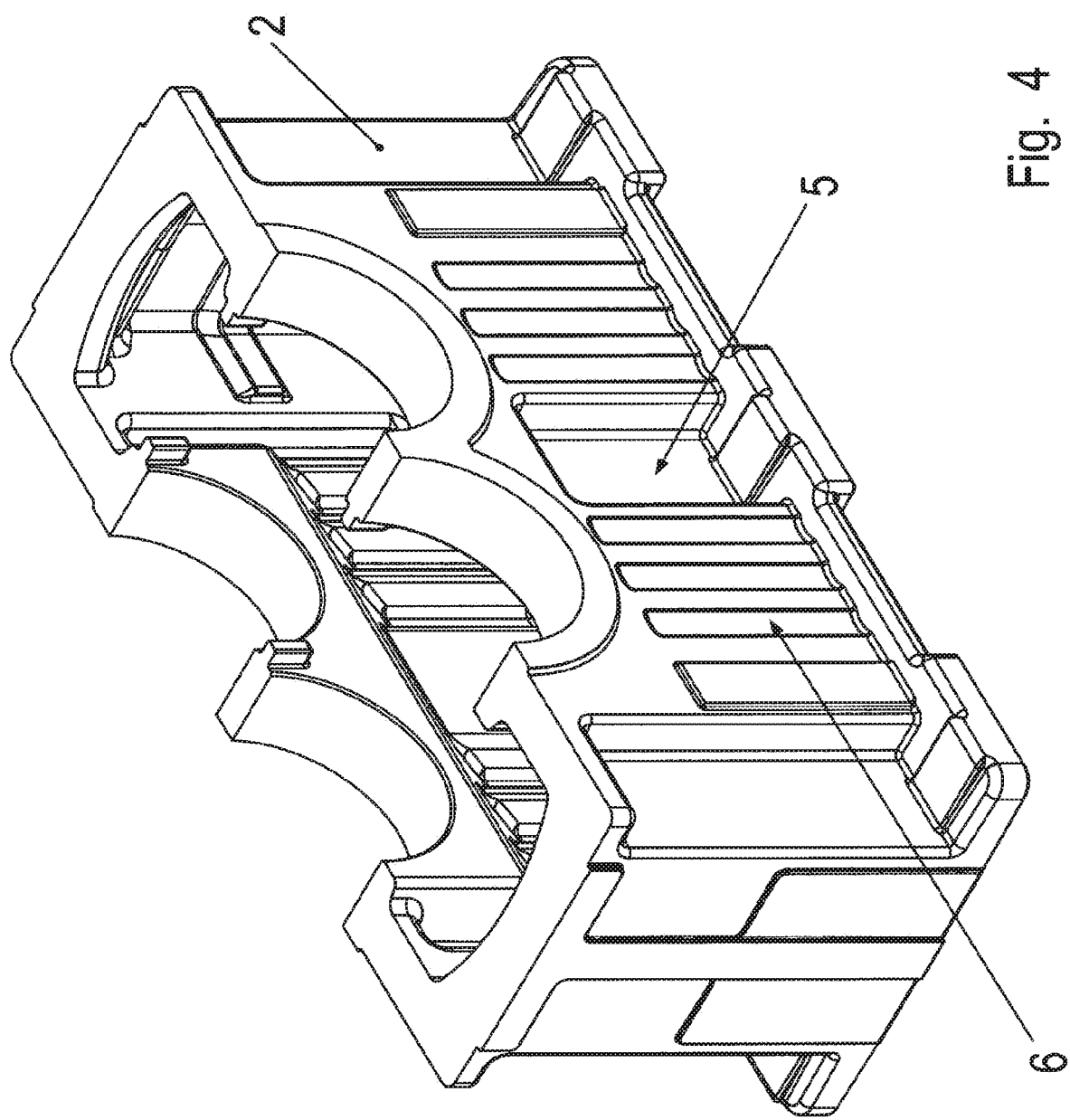
FIG. 4 shows an oblique view of housing bottom part 2.
Figure 5:
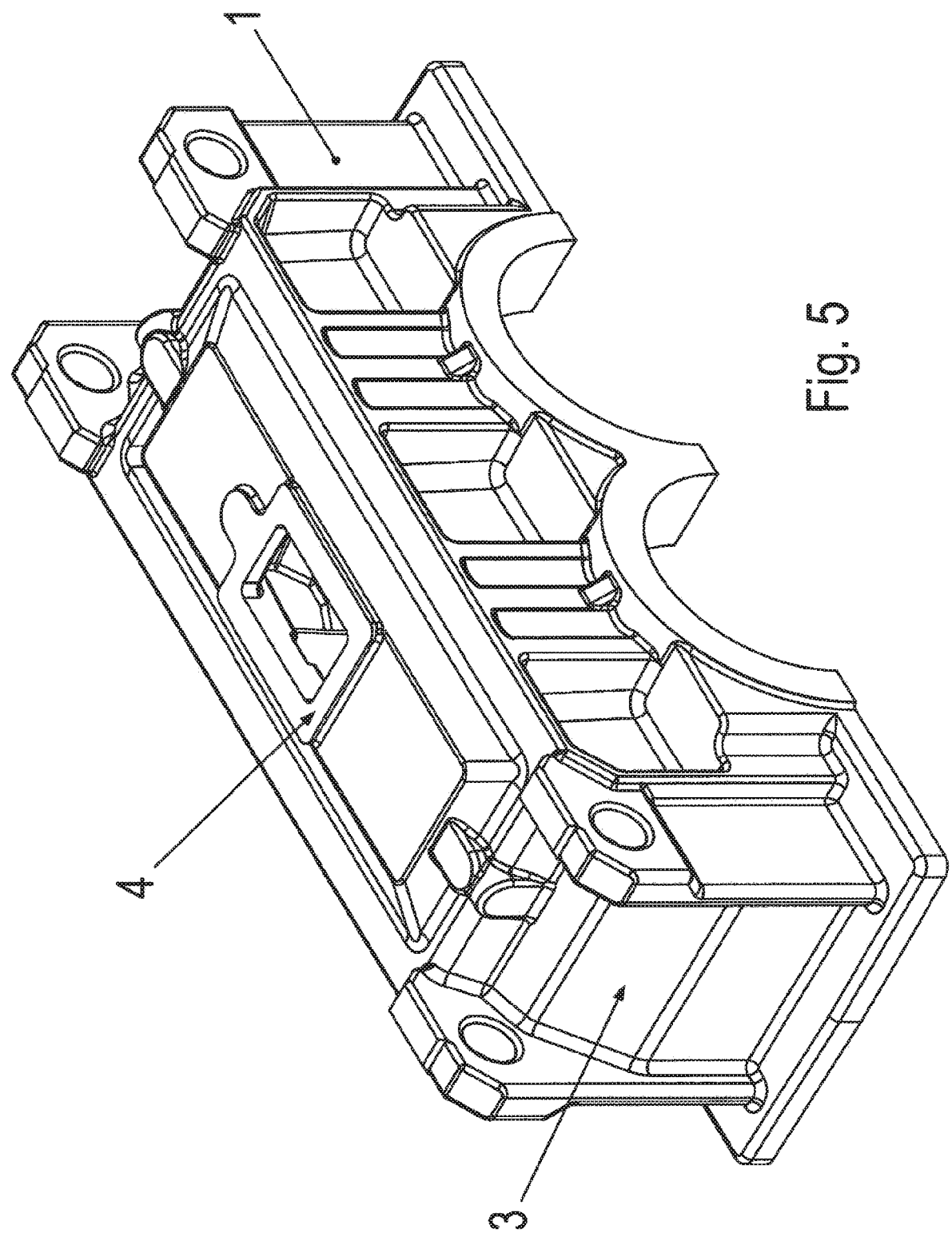
FIG. 5 shows an oblique view of housing top part 1.
Figure 6:
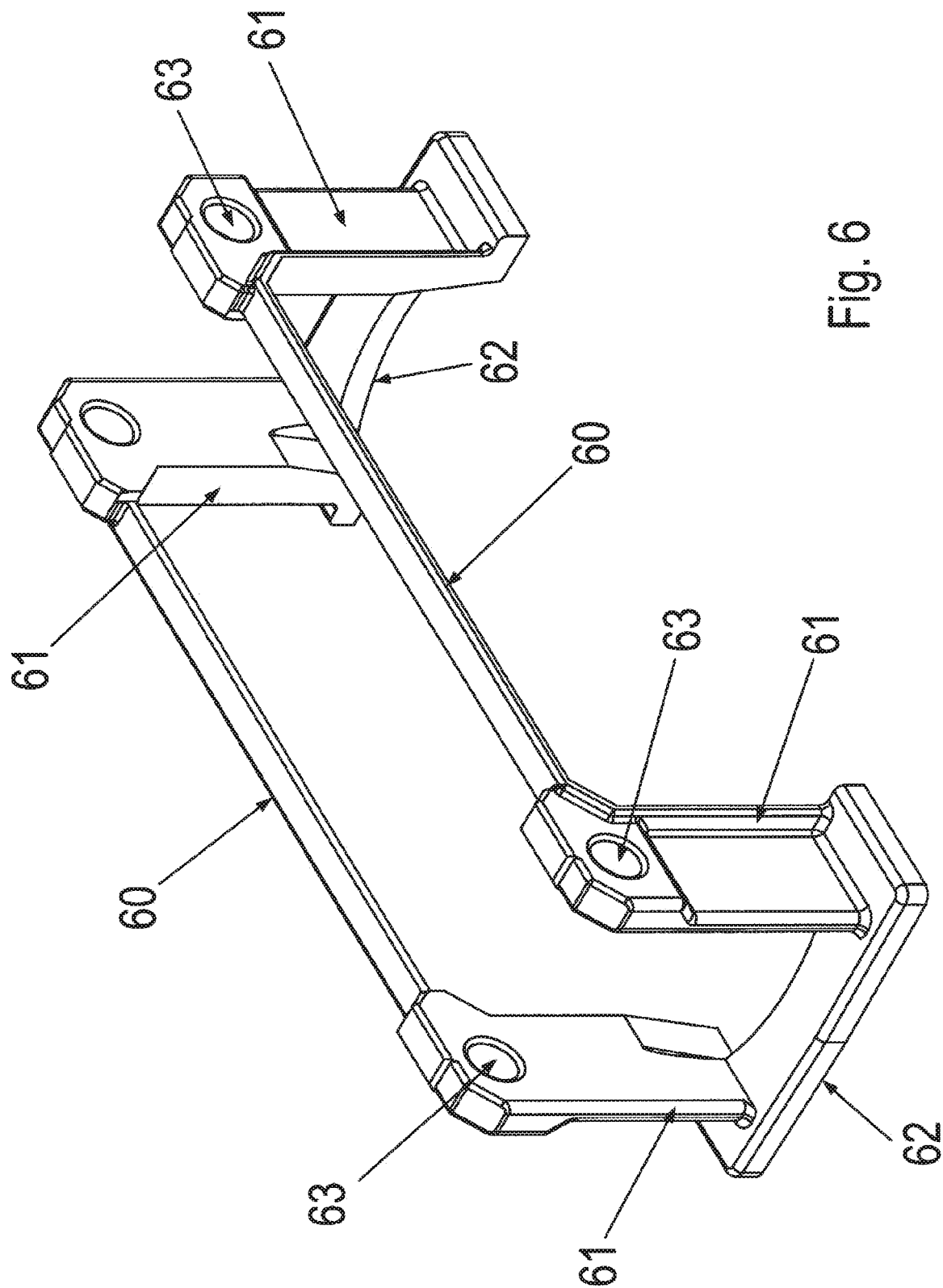
FIG. 6 shows the frame-like support section of housing top part 1.
Figure 7:
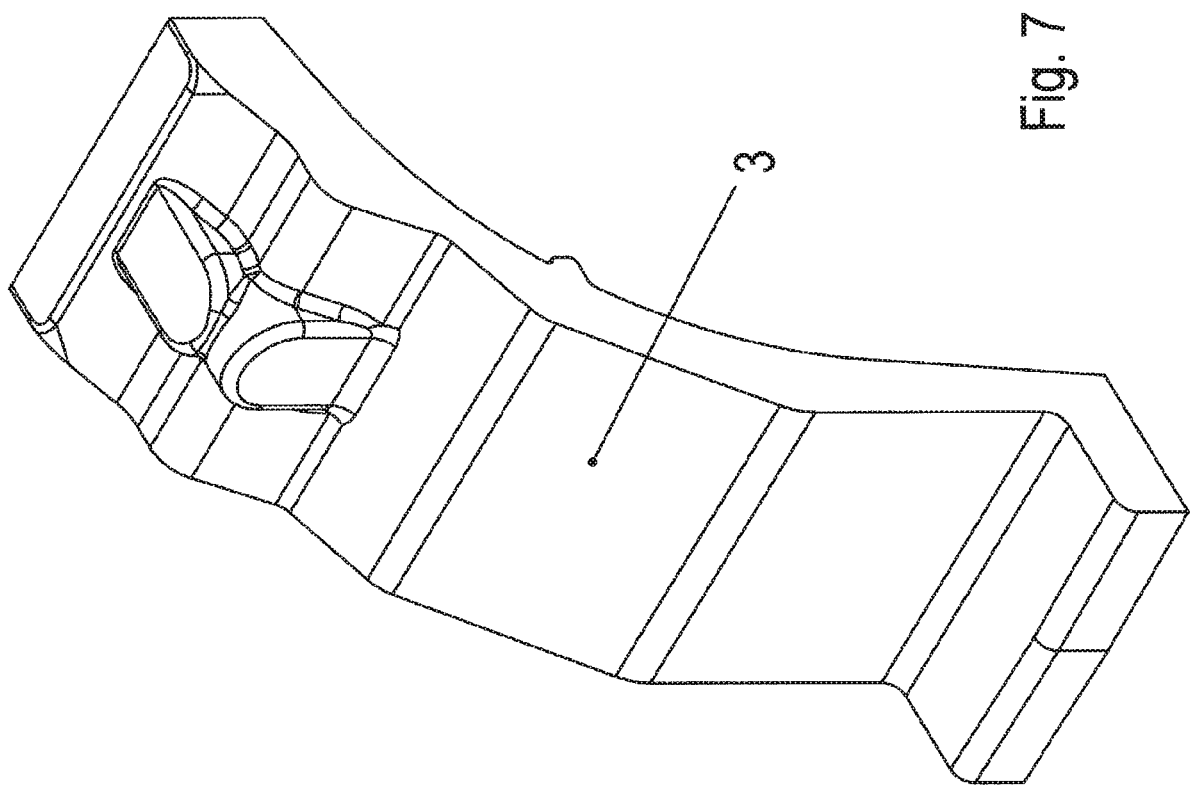
FIG. 7 shows a side wall section 3, which is inserted into the frame-like support section.
Figure 8:
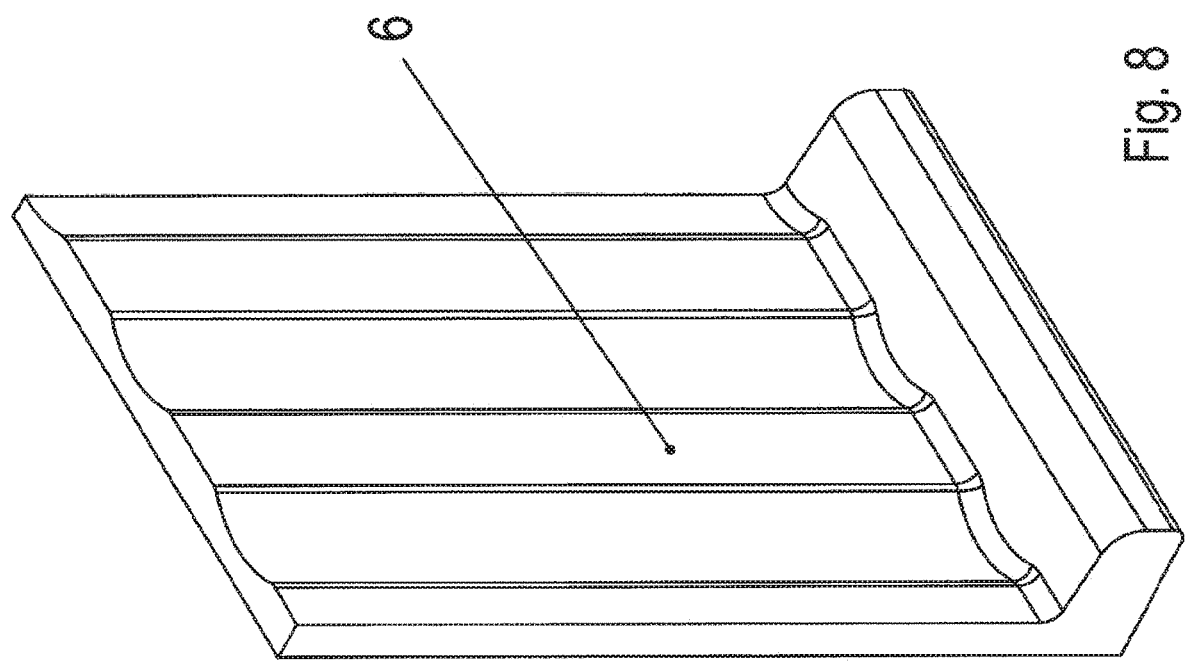
FIG. 8 shows a wall section having a wave structure, thus, especially a concave-convex wall section.
Figure 9:
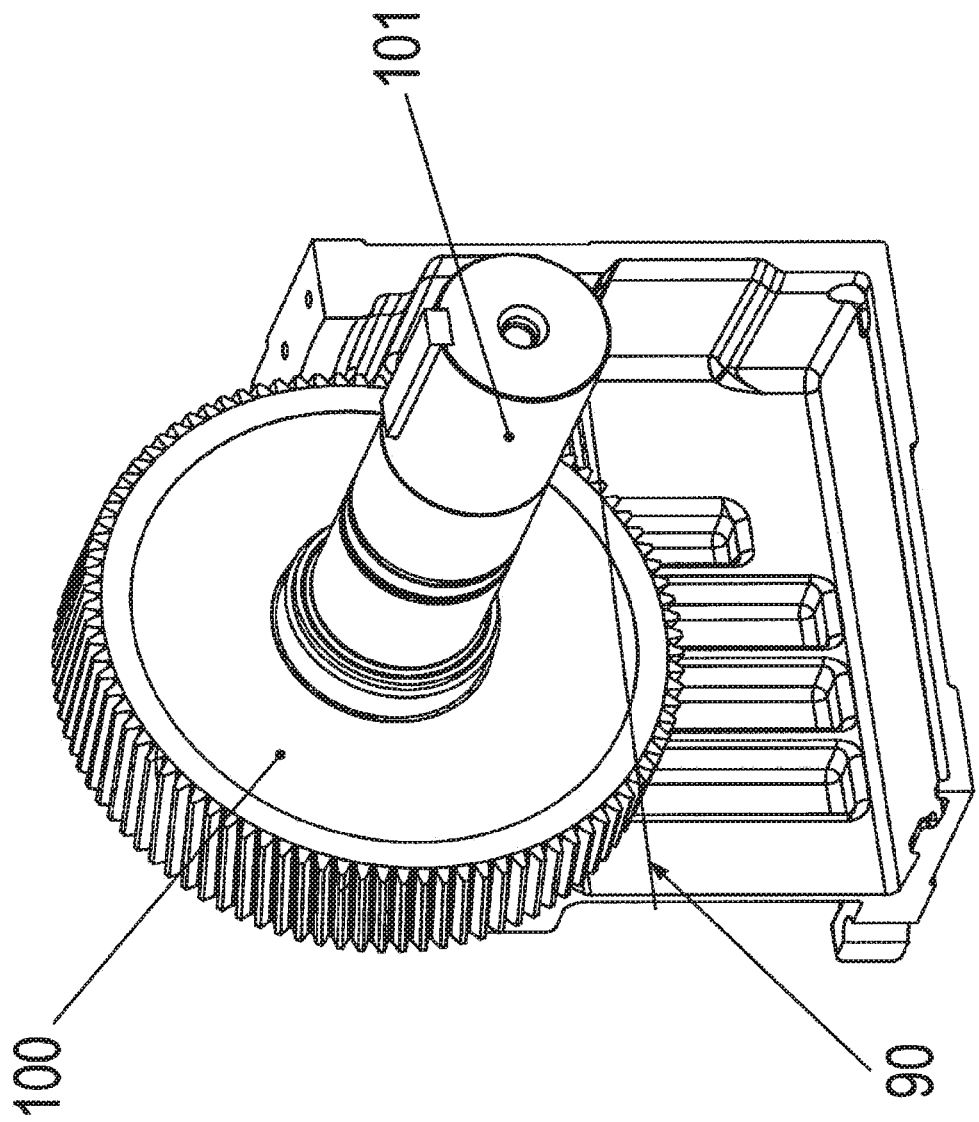
FIG. 9 shows oil level 90.

As shown in FIG. 1, housing bottom part 2 is disposed below housing top part 1. Thus, housing top part 1 is situated above housing bottom part 2 in the vertical direction, the housing top part 1 being disposed on a first side of a plane P and the housing bottom part 2 being disposed on the other side of the plane P.

Housing top part 1 has a frame-like support section, which takes up and conducts the major portion of the forces. The remaining sections of housing top part 1 are formed only for the oil-tight enclosure of the gear-unit interior, e.g., are formed with thinner wall thickness than the support section and join closely to the support section.

Consequently, housing top part 1 as well as housing bottom part 2 are formed in shell-like fashion.

The frame-like support section of housing top part 1 has a first transverse rib 62. It extends mainly in the horizontal direction H.

Two first ribs 61 are set apart from each other, and in each case are joined to first transverse rib 61, particularly at two points set apart from each other.

First ribs 61 stretch mainly in the vertical direction, e.g., are extended further in the vertical direction than in any direction transverse to it.

The frame-like support section of housing top part 1 also has a second transverse rib 62. It extends mainly in the horizontal direction.

Two second ribs 61 are set apart from each other, and in each case are joined to second transverse rib 61, particularly at two points set apart from each other.

Second ribs 61 stretch mainly in the vertical direction, e.g., are extended further in the vertical direction than in any direction transverse to it.

Each first rib 61 and each second rib 61 has a lifting eye 63 at its end area facing away from the respective transverse rib. Thus, the gear unit is able to be picked up at the lifting eyes by hooks or cable and is easily transportable. The forces occurring during transport are introduced at lifting eyes 63 into the end areas and thus into the frame-like support section. Consequently, the gear-unit housing becomes only negligibly deformed and remains undamaged.

A first rib 61 is joined at its end area to a bar 60, particularly a support bar, which at its other end is joined to the end area of a second rib 61. In the same manner, the other rib 61 is joined at its end area to a bar 60, particularly a support bar, that in turn is joined at its other end to the end area of the other second rib 61. The two bars 60 are disposed in parallel and set apart from each other.

As described above, wall sections are conformed to the frame-like support section—formed thus of ribs 61, transverse ribs 62 and bars 60—of housing top part 1, so that the shell-like housing top part is able to be formed in one piece, particularly as a casting.

In this connection, the wall sections, especially also two side wall sections 3 and the wall section having a concave-convex wave structure, are thus integrally molded and conformed to the frame-like support section and implemented in one piece.

Bars 60 stretch mainly in the horizontal direction, e.g., are extended further horizontally than in any direction transverse to that.

The frame-like support section is thus realized by an increase in the wall thickness.

In addition, thickened areas or sections 157 are also provided on housing top part 1, which are intended as bearing mounting for at least one part, especially half, of the circumference of an outer ring of a bearing. These arch-like thickened areas adjoining one another are joined to transverse ribs 62, especially in each case in that end area in which respective rib 61 is joined.

The concave-convex wave structure of the wall sections enlarges the surface area, and therefore reduces resistance to the transfer of heat to the ambient air. In this context, an especially sharp depression is provided as depression 5 for a manipulation area for screw connections. In this case, the screws are connecting screws by which housing top part 1 and housing bottom part 2 are screw-connected.

Housing bottom part 2 has a wave structure 6, particularly a concave-convex wall section, which likewise enlarges the surface area, and therefore reduces resistance to the transfer of heat from the gear-unit interior, especially lubricating oil, to the ambient air.

The housing cover is provided to close an opening 300 in housing top part 1, the opening 300 being surrounded by the frame-shaped support section, especially with clearance 302. That means that the frame-shaped support section does not directly contact the opening 300, but rather is set apart from the opening 300.

Figure 10:
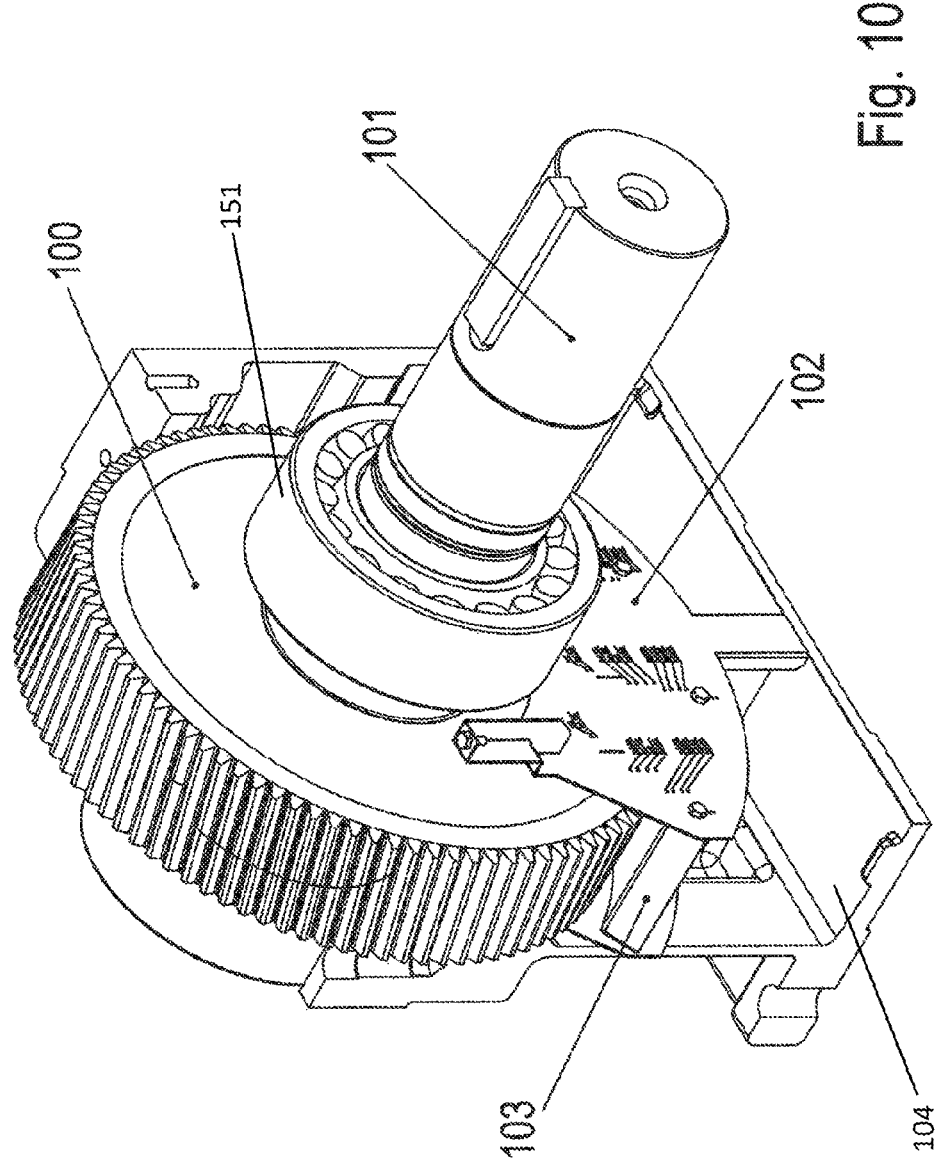
FIG. 10 shows a gear wheel 100 of the gear unit that is mounted in rotatably fixed manner on a shaft 101 supported in the gear-unit housing, and is at least partially surrounded by a trough secured to housing bottom part 2.
Figure 11:
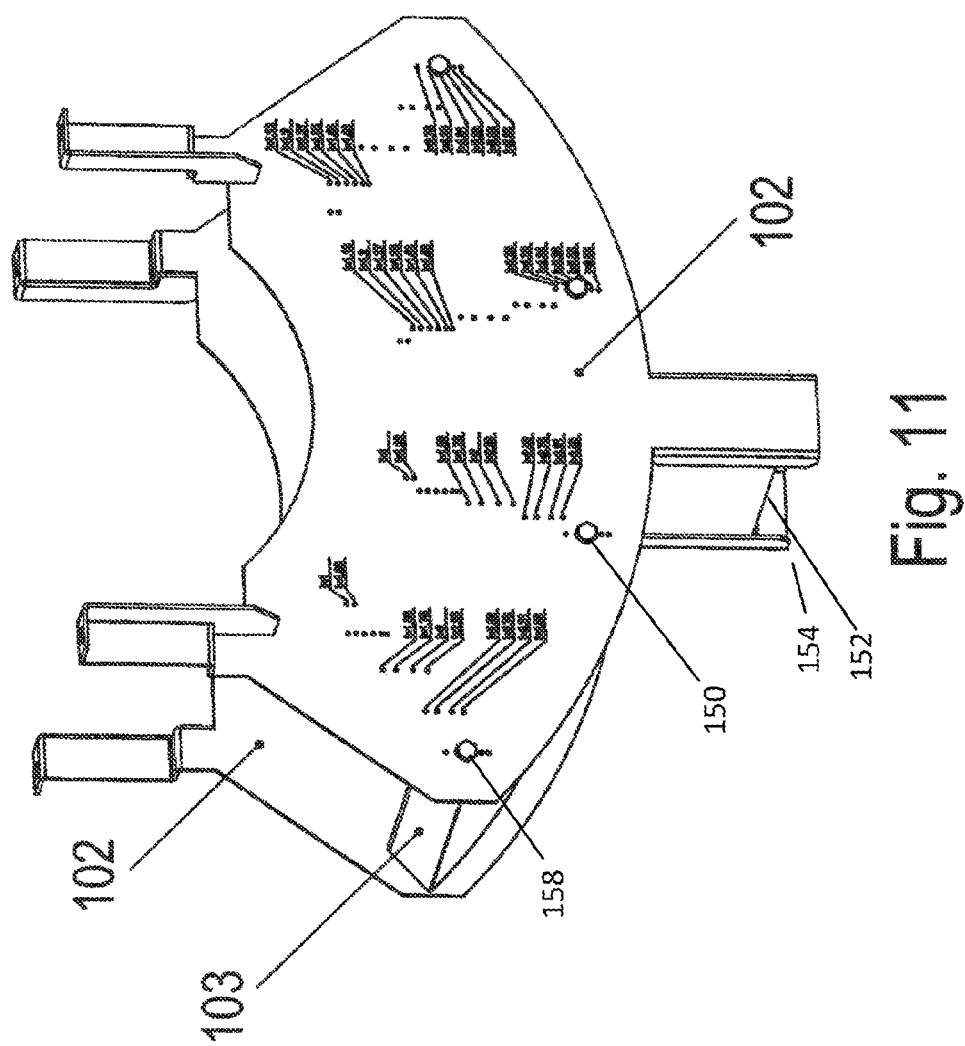
FIG. 11 shows the trough itself in oblique view, the trough having side walls 102 and a bottom plate 103.

As shown in FIG. 10, gear wheel 100 is joined in rotatably fixed manner to shaft 101, which is supported in the housing by a bearing 151. In this context, the bearing 151 is accommodated in a bearing mounting in the housing 12, a first part of the bearing mounting 153 being located in housing top part 1 and a second part of the bearing mounting 155 being located in housing bottom part 2.

The lower spatial area surrounding gear wheel 100 is enclosed by the trough, the trough having side walls 102 and a bottom plate 103. Thus, it is able to be fabricated from three parts.

Side walls 102 of the trough are secured to bottom plate 103. At its lowest area, e.g., lowest surface area and/or surface area having a greatest radial distance 154 from the toothing part and/or the gear wheel, bottom plate 103 has a protuberance 130 directed downward. Protuberance 130 is directed radially away from the gear wheel, and is open at its radially outer end area. Thus, lubricating oil of the gear unit gets from the oil pan of the gear unit through protuberance 130 up to gear wheel 100. Laterally, e.g., on both sides in the axial direction, the protuberance is closed by a respective tab section 120 of side walls 102, so that an opening and/or a channel 152 is formed passing through radially to gear wheel 100.

Figure 12:
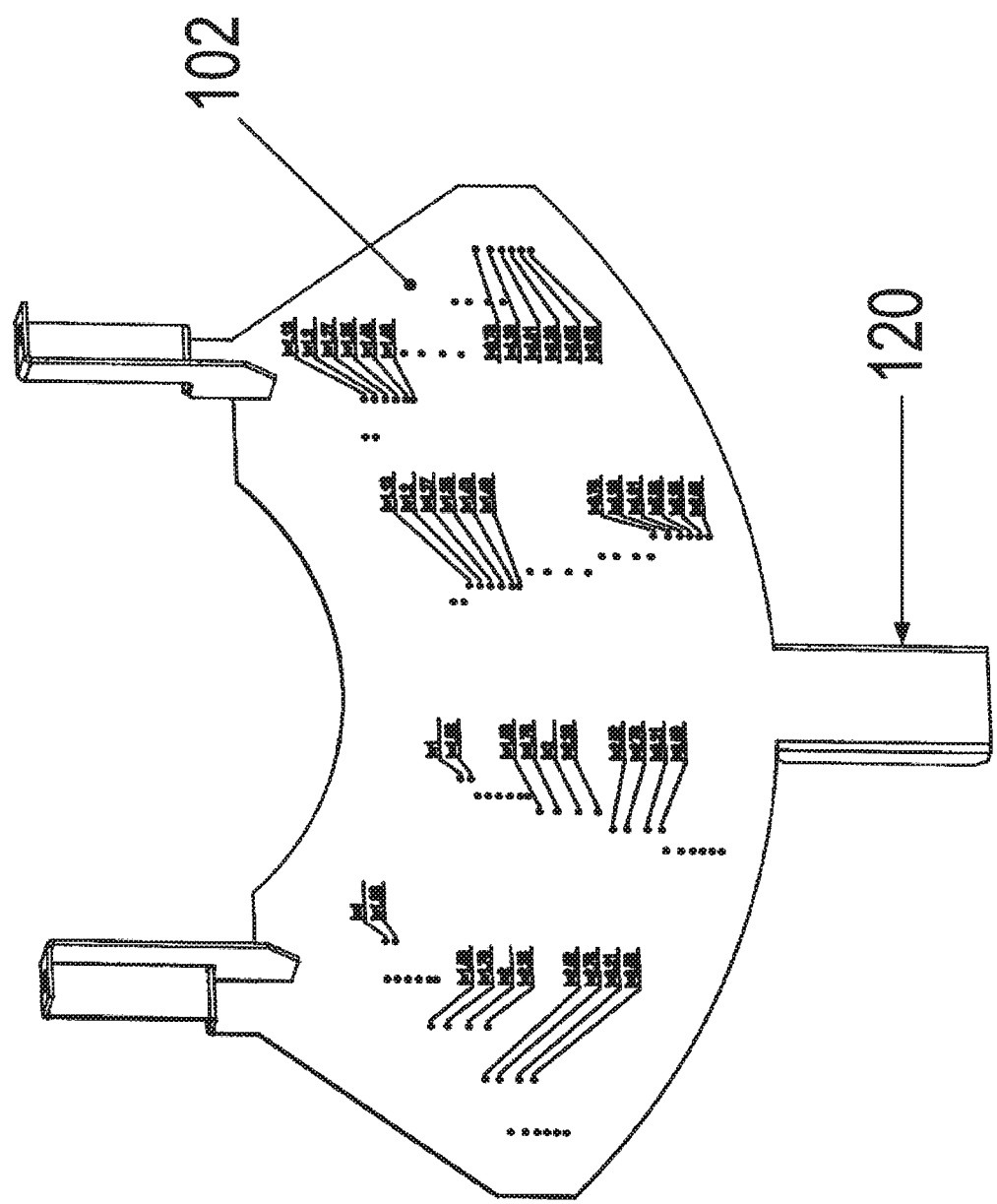
FIG. 12 shows a side wall 102 of the trough.
Figure 13:
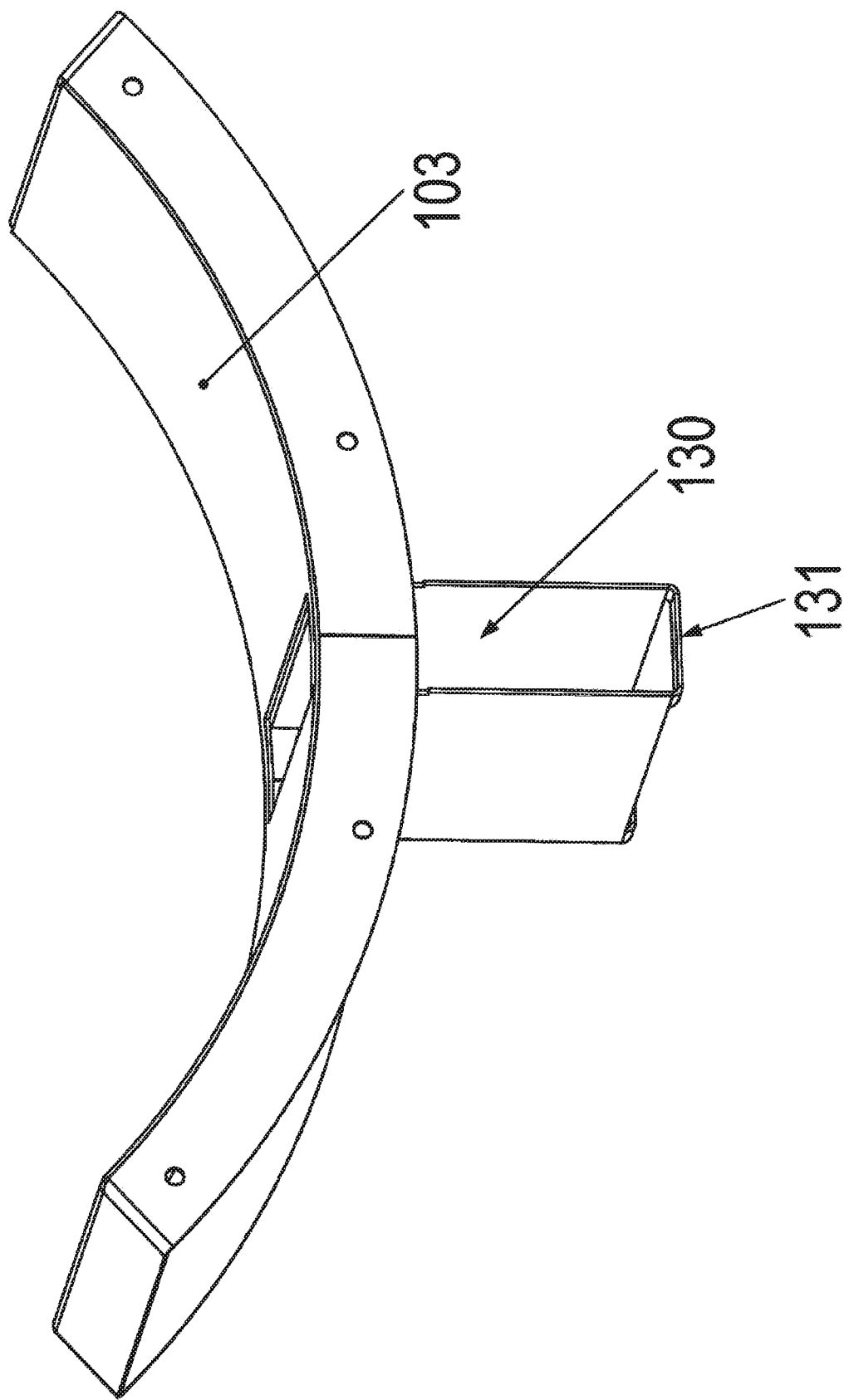
FIG. 13 shows bottom plate 103 of the trough.
Figure 14:
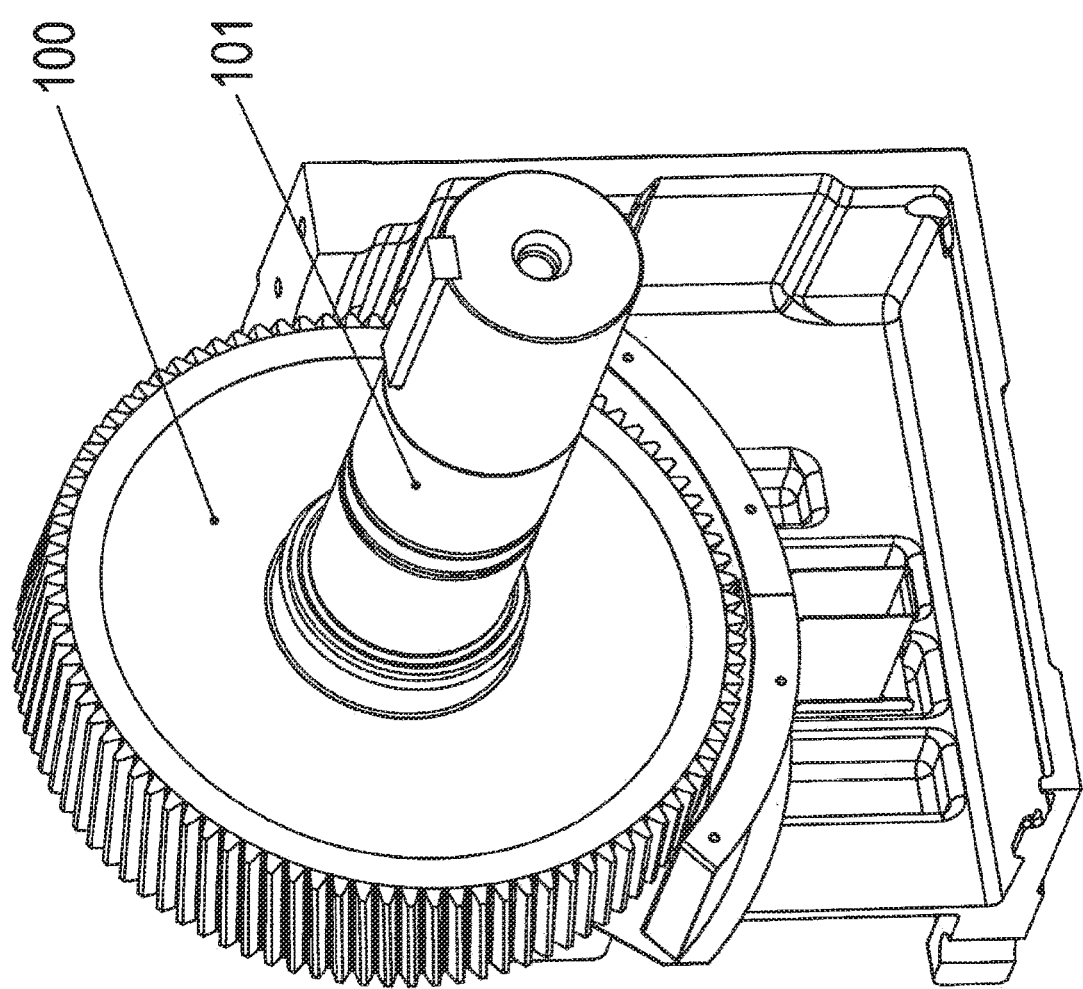
FIG. 14 shows the trough without front side wall 102, so that the gear wheel is visible in oblique view, a first section being denoted.
Figure 15:
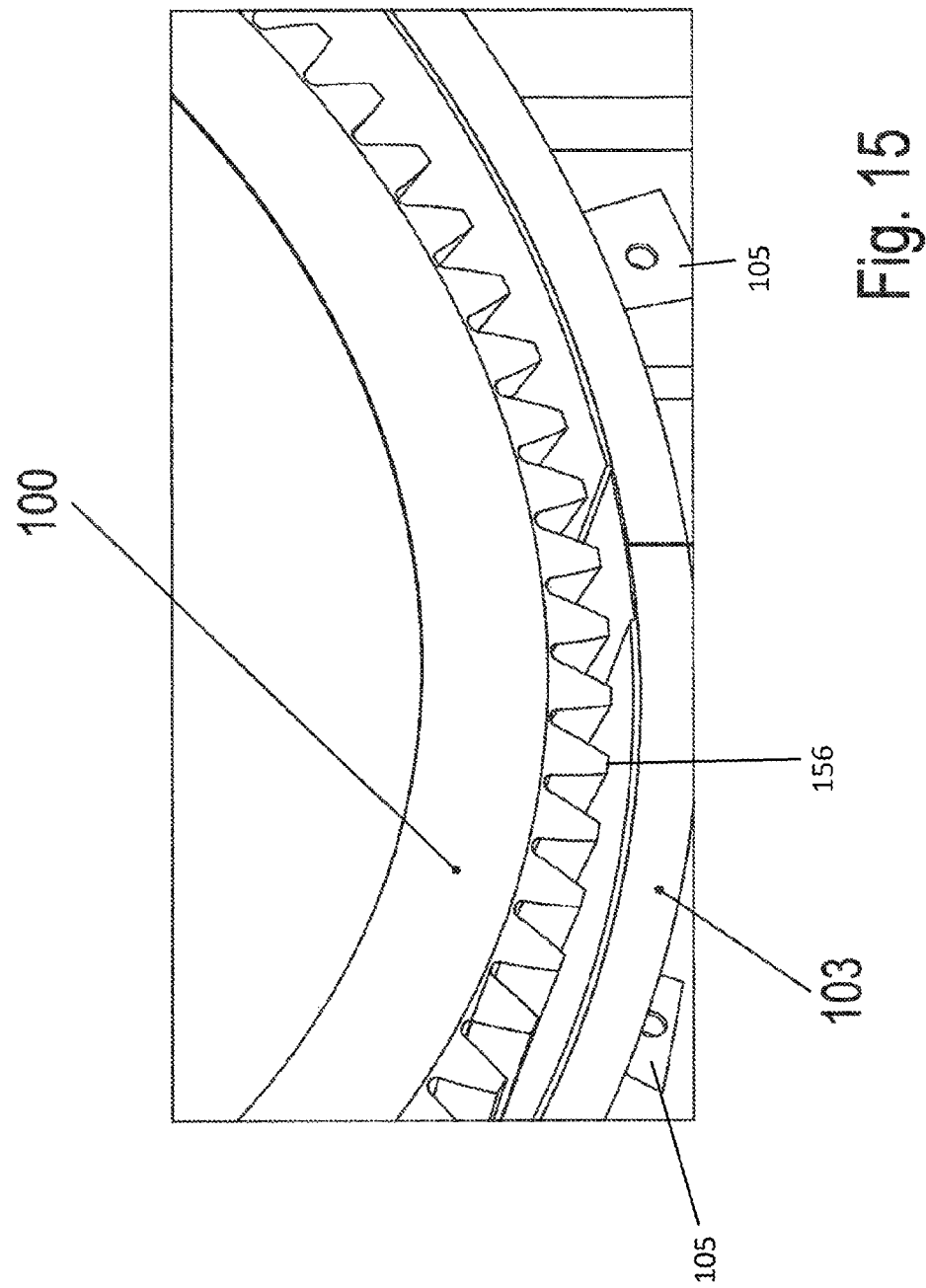
FIG. 15 shows the first section from FIG. 14 enlarged, a second section being denoted, abd tab sections 105 of bottom plate 103 being illustrated.
Figure 16:
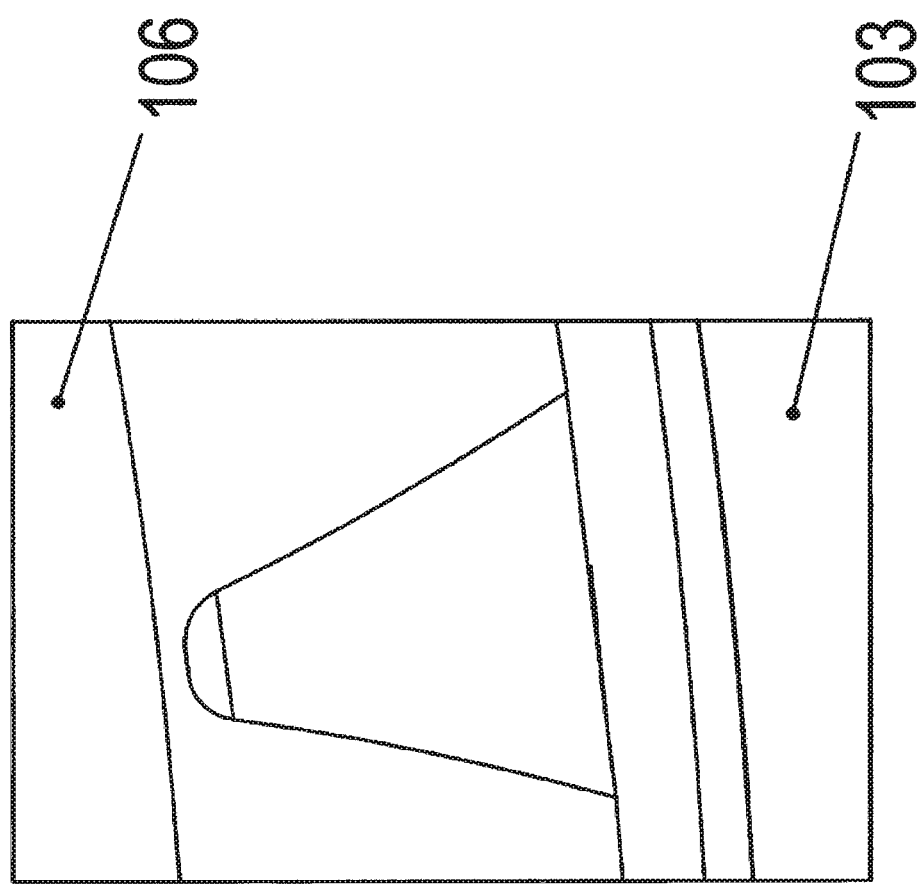
FIG. 16 shows the second section from FIG. 15 enlarged.

As illustrated in FIG. 12, in each case side walls 102 are punched out as a sheet-metal part, and at their axial outer side, have markings which identify the positions of bore holes to be introduced, particularly as a function of the transmission ratio of the gear unit and/or toothing data of gear wheel 100.

Screws 158 are guided through the bore holes, making a screw connection 150 achievable between bottom plate 103 and respective side wall 102.

Therefore, depending on the size or other toothing data, the bottom plate is able to be positioned at an optimal radial distance from the central axis of the gear wheel.

Bottom plate 103 is likewise produced as a stamped bent part, and has a U-shaped cross-section. In this context, it is bent such that the distance between the toothing, particularly the crowns 156 of the teeth of the toothing of gear wheel 100 located in the same angle at circumference as bottom plate 103, is constant. Thus, a narrow gap is provided between these tooth crowns and bottom plate 103.

Consequently, a pumping action develops during rotational movement of gear wheel 100, since the lubricating oil located in the tooth spaces is moved with greater velocity than the lubricating oil in the channel. In this manner, lubricating oil is thus conveyed through the channel 152 from the oil pan 104 to gear wheel 100 and is then moved along with it.

The trough also reduces the losses due to splashing during movement of gear wheel 100, for the teeth of the toothing of gear wheel 100 dip in the spatial area surrounded by the trough.

With the exception of tab sections 120 and protuberance 130, U-shaped bottom plate 103 is bent circularly in the circumferential direction, so that the distance between the teeth of the toothing of gear wheel 100 and bottom plate 103 is substantially constant in the corresponding angle-at-circumference area.

Tab sections 120 are directed radially to the outside, so that respective side wall 102 is able to be pressed in the axial direction onto bottom plate 103, particularly at its tab sections 120, and screw-connected.

With the aid of the pumping action of gear wheel 100 in interaction with the trough, oil is pumped to a position situated higher than the oil level of the oil pan, and from there is conducted via a temporary storage or directly to the places to be lubricated, such as bearings or engaging tooth systems, e.g., parts, bearings, and/or toothing parts 20. Appropriate conduits or pipes are provided for this purpose.

Protuberance 130 is able to be produced by bending out from the original form of bottom plate 103. To that end, a punching sheet is bent such that two areas, bent in the shape of circle segments, are set apart from each other over an area bent substantially in the shape of a rectangle. After that, the areas bent in the shape of circle segments are pressed against each other, and thus form the circular area of bottom plate 103. At the same time, the areas bent in the shape of circle segments encompass an opening. The area bent in the shape of a rectangle likewise has a centrally located opening and thus forms protuberance 130.

Figure 17:
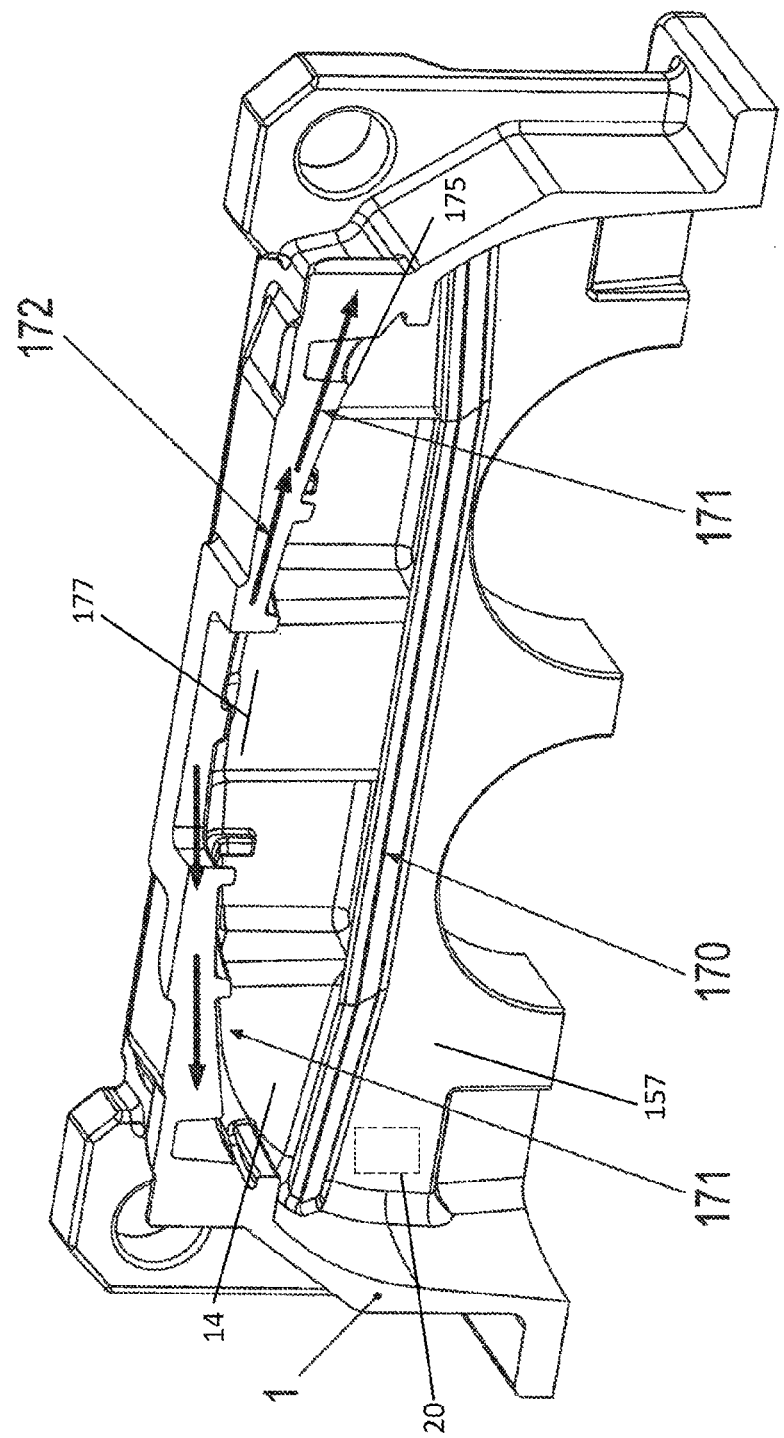
FIG. 17 shows the housing of the gear unit cut into in the longitudinal direction, so that the curvature of the vault wall, especially the arched profile in the longitudinal direction, is visible.
Figure 18:
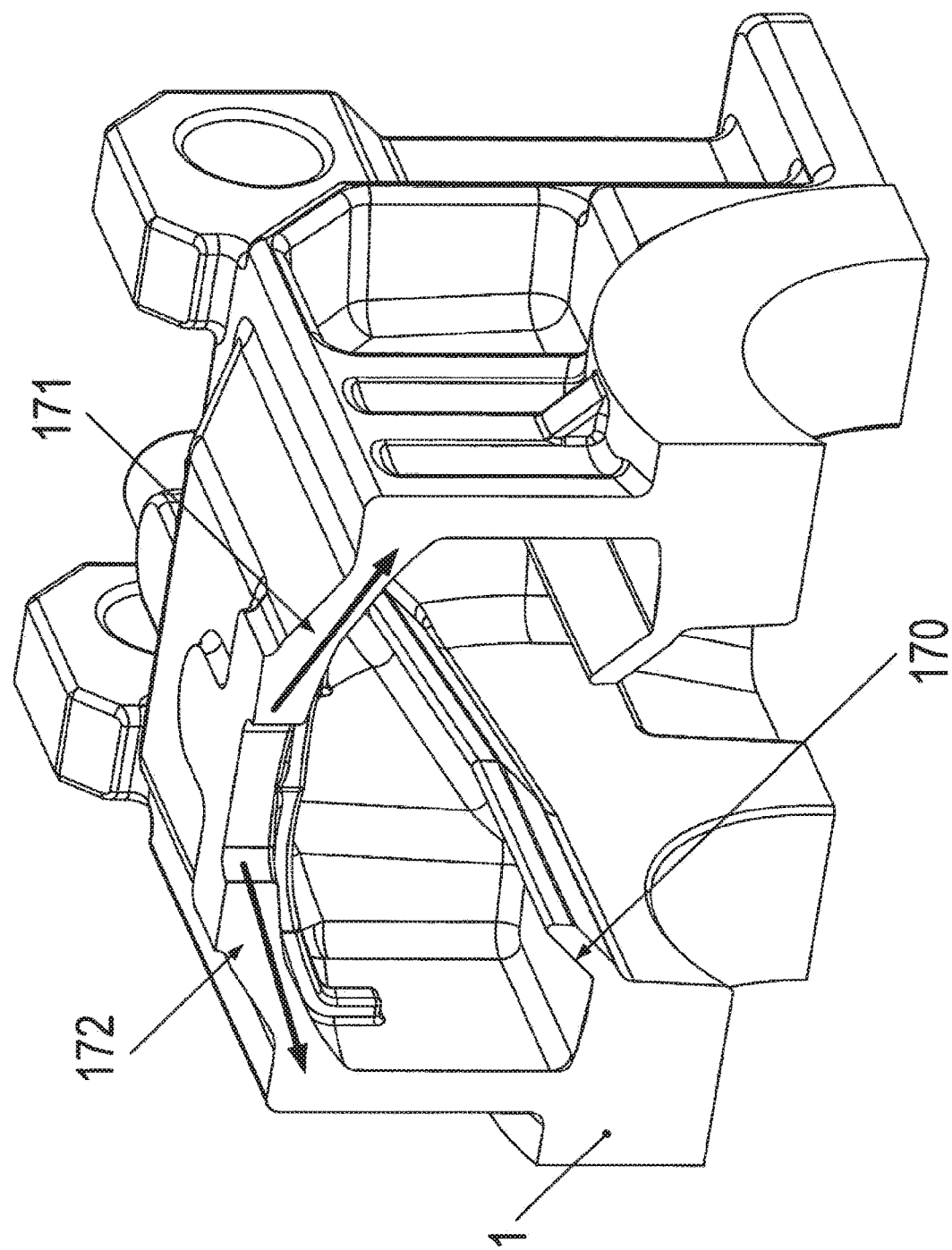
FIG. 18 shows the housing of the gear unit cut into in the transverse direction, so that the curvature of top wall 171, especially the arched profile in the transverse direction, is visible.

As illustrated in FIGS. 17 and 18, top wall 171 is curved, a differently curved profile being present in the longitudinal direction L than in the transverse direction T. In this case, the inclination is such that oil droplets which, for example, are sprayed by a gear wheel 100 of the gear unit up onto the top, preferably flow off in the transverse direction T along top wall 171. Below top wall 171, particularly below the end area of top wall 171 situated in the longitudinal direction L, a groove is formed whose groove wall 170 extends in the longitudinal direction L, e.g., extends further in the longitudinal direction L than in the transverse direction T or other direction perpendicular to the longitudinal direction L. In the same manner, a further groove is located below the end area of top wall 171 disposed counter to the longitudinal direction L. As noted above, transverse direction T may be aligned parallel to the axis of the output shaft A1, the longitudinal direction L being aligned perpendicular to and/or transverse to the transverse direction T, in particular, the longitudinal direction L being aligned parallel to the plane defined by an axis of an intermediate shaft A2 and an axis of an output shaft A1.

Thus, the oil sprayed up onto top wall 171 flows off either in the longitudinal direction or counter to the longitudinal direction to the respective end area of top wall 171, and drips down into the respective groove. From there, the oil is guided to a bearing to be lubricated or to a toothing part to be lubricated, e.g., parts, bearings, and/or toothing parts 20.

The groove is formed in one piece on housing top part 1, e.g., by shaping of the steel casting, and therefore is formed integrally with housing top part 1.

From the highest point of concave top wall 171, the oil flows off faster in the transverse direction than in the longitudinal direction, because the curvature and gradient and/or slope 175 are greater in the transverse direction.

The top wall is extended further in the longitudinal direction than in the transverse direction.

Oil-flow direction 172 on top wall 171 is therefore directed outward, e.g., directed in the longitudinal direction or counter to the longitudinal direction, and consequently the oil droplets are conveyed toward the groove.

Therefore, not only is oil conveyed to a higher position, especially into the groove, by the conveying effect of the gear wheel together with the trough, but also the oil spraying around is conveyed into the groove. Consequently, sufficient oil is available for lubrication.

Figure 19:
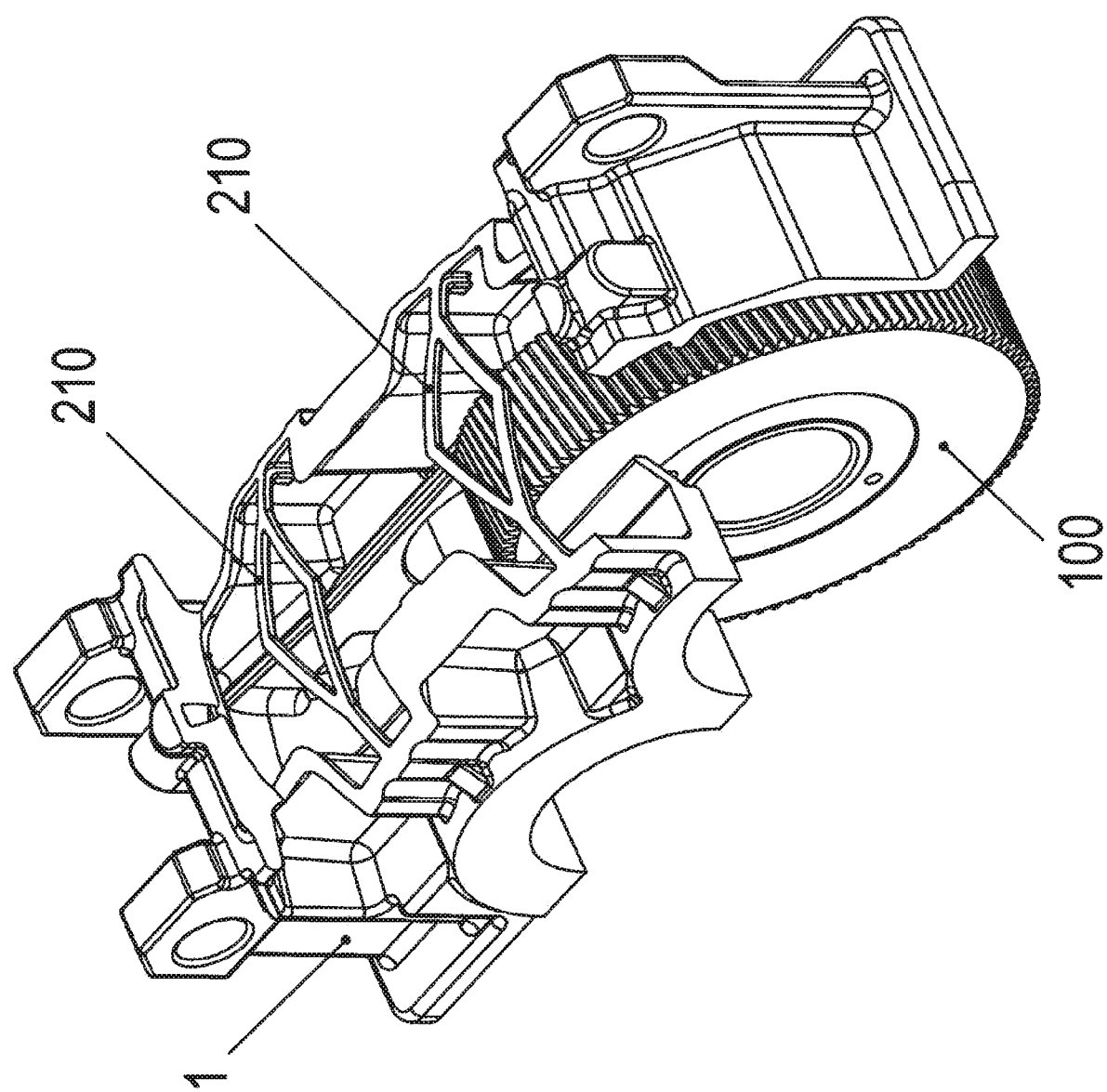
FIG. 19 shows a rhombus-like oil-guiding structure implemented as oil-guiding rib structure 210, oil-guiding rib structure 210 being formed or disposed on the inner 14 side of top wall 171.

As shown in FIGS. 19 through 21, top wall 171 has a rhombus-like structure that projects into the interior space and collects the oil sprayed up by gear wheel 100 and conducts it in the transverse direction or counter to the transverse direction to the respective groove.

In FIG. 20, oil-flow direction 201 along oil-guiding rib structure 210, as well as oil-spray direction 202 are indicated.

Oil-guiding rib structure 210 has a rhombus-like structure whose two adjacent sides pointing in the transverse direction are merged to form a collector rib section 212 that conducts the oil toward the groove and/or has an end section of a kind that the oil drips off into the groove.

The rib sections 208 formed as sides of the rhombus extend from the area of vanishing or slight slope, e.g., vanishing gradient 177, of top wall 171 up to an area in which the amount of the slope is greater. From there, the collector rib section extends up to an area in which the amount of the slope is even greater.

As illustrated in FIG. 19, not just one, but also a further oil-guiding rib structure 210 is shown on top wall 171. It is assigned to a further gear wheel or is disposed such that upon reversal of the direction of rotation of gear wheel 100, the area of top wall 171 is sprayed upon which has this further oil-guiding rib structure 210. The rib structure may include an elevation 204 and/or a depression 206.

In further exemplary embodiments according to the present invention, other structures may be used. For example, not just two, but rather a plurality of rib sections are directed to a collector rib section, so that the rib sections form a finger-like structure.

In this instance, the rib sections again extend from the area of vanishing or slight slope of top wall 171 up to an area in which the amount of the slope is greater. From there, the collector rib section again extends up to an area in which the amount of the slope is even greater.

Alternatively, oil-guiding rib structure 210 may also be realized as a separate part, e.g., not as an elevation formed in the casting mold on housing top part 1 and projecting toward the interior, but rather as a part secured to top wall 171 of the housing top part.

As a further alternative, oil-guiding rib structure 210 is implemented not as an elevation, but rather as a depression, such as a groove or the like, in top wall 171 of housing top part 1.

LIST OF REFERENCE CHARACTERS

1 housing top part
2 housing bottom part
3 side wall section
4 housing cover
5 depression for manipulation area for screw connections
6 wave structure, especially concave-convex wall section
10 gear unit
12 housing
14 inner side
20 parts, bearings, and/or toothing parts
60 bar
61 rib
62 transverse rib
63 lifting eyes
90 oil level
100 gear wheel
101 shaft
102 side wall
103 bottom plate 104 oil pan
105 tab section
120 tab section
130 protuberance
150 screw connection
151 bearing
152 opening and/or channel
153 first part of bearing mounting
154 lowest surface area and/or surface area having a greatest radial distance
155 second part of bearing mounting
156 crown of gear teeth
157 thickened section
158 screw
170 groove wall
171 top wall
172 oil-flow direction on top wall 171
175 gradient and/or slope
177 vanishing gradient
210 oil-guiding rib structure
201 oil-flow direction
202 oil-spray direction
204 elevation
206 depression
208 rib section
212 collector rib section
300 opening
302 clearance
P plane
L longitudinal direction
T transverse direction
H horizontal
A1 axis of output shaft
A2 axis of intermediate shaft

What is claimed is:

1. A gear unit, comprising:
a housing including a housing top part and a housing bottom part on which the housing top part is mounted, the housing top part being disposed on a first side of a plane and the housing bottom part being disposed on another side of the plane, the housing top part having a top wall at least partially delimiting an interior of the gear unit, at least one oil-guiding rib structure being disposed on the top wall, at least one rib section of a respective oil-guiding rib structure extending from an area of the top wall having a slight or vanishing slope with respect to the plane to an area of the top wall having a greater slope with respect to the plane in terms of actual amount, the housing top part including at least one longitudinal groove extending in a longitudinal direction of the gear unit along an entire longitudinal length of the interior of the gear unit delimited by the housing top part and at least one transverse groove extending in a transverse direction of the gear unit along an entire transverse length of the interior of the gear unit delimited by the housing top part, the transverse direction being transverse to the longitudinal direction, the oil-guiding rib structure adapted to guide oil to at least the longitudinal groove.

2. The gear unit according to claim 1, wherein the housing top part includes an interior space in which the grooves are arranged.

3. The gear unit according to claim 1, wherein the rib structure includes an elevation and/or a depression.

4. The gear unit according to claim 1, wherein the plane is a horizontal plane.

5. The gear unit according to claim 1, wherein the at least one rib section of the respective oil-guiding rib structure has two or more rib sections that lead into a collector rib section.

6. The gear unit according to claim 5, wherein the collector rib section is adapted to supply the oil to the groove, the collector rib section of the oil-guiding rib structure extending from a first area of the top wall to a second area of the top wall.

7. The gear unit according to claim 1, wherein the top wall that at least partially delimits the interior of the gear unit is curved and/or concave, in the longitudinal direction and in the transverse direction, such that oil droplets sprayed up toward the top wall drip off in or counter to the transverse direction along the top wall into the at least one groove.

8. The gear unit according to claim 7, wherein the oil is supplied from the groove to parts, bearing and/or toothing parts.

9. The gear unit according to claim 7, wherein an amount of a gradient of the top wall and/or the slope of the top wall relative to a horizontal direction increases greater in the transverse direction with increasing distance from a highest point of the top wall and/or from a point of the top wall with vanishing gradient than in the longitudinal direction.

10. The gear unit according to claim 1, wherein the groove is formed on an inner side of the housing top part, is formed integrally on the housing top part, and/or is formed in one piece on the housing top part.

11. The gear unit according to claim 10, wherein an amount of a gradient of the top wall and/or the slope of the top wall relative to a horizontal direction increases greater in the transverse direction with increasing distance from a highest surface point of the top wall and/or from a surface point of the top wall with a vanishing gradient than in the longitudinal direction.

12. The gear unit according to claim 1, wherein the top wall includes a plurality of oil-guiding rib structures.

13. The gear unit according to claim 12, wherein the plurality of oil-guiding rib structures is produced as a separate part and joined to the housing top part.

14. The gear unit according to claim 1, wherein the transverse direction is aligned parallel to an axis of an output shaft, the longitudinal direction being aligned perpendicular to and/or transverse to the transverse direction and/or being aligned parallel to the plane defined by an axis of an intermediate shaft and the axis of the output shaft.

15. The gear unit according to claim 1, wherein the top wall is formed in a manner corresponding to a vault.

16. A gear unit, comprising:
a housing including a housing top part and a housing bottom part on which the housing top part is mounted, the housing top part being disposed on a first side of a plane and the housing bottom part being disposed on another side of the plane, the housing top part having a top wall at least partially delimiting an interior of the gear unit, at least one oil-guiding rib structure being disposed on the top wall, at least one rib section of a respective oil-guiding rib structure extending from an area of the top wall having a slight or vanishing slope with respect to the plane to an area of the top wall having a greater slope with respect to the plane in terms of actual amount, the housing top part including at least one groove, the oil-guiding rib structure adapted to guide oil to the groove;
wherein a trough adapted to guide the oil and reduce losses due to splashing surrounds a circumferential section of a toothing part and/or a gear wheel, in radial and axial directions, the trough including at least three parts, including at least one bottom plate and two side walls, the bottom plate being screw-connected to the two side walls, the trough being fastened to the housing, the trough having an opening and/or a channel at a lowest surface area and/or at a surface area having a greatest radial distance from the toothing part and/or the gear wheel, during rotational movement of the toothing part and/or the gear wheel, the oil being conveyed from an oil pan of the gear unit through the opening and/or the channel between the trough and the toothing part and/or the gear wheel, to a position higher than a level of the oil pan, into the groove, the bottom plate and the side walls being stamped bent parts.

17. The gear unit according to claim 16, wherein a distance and/or a distance in the radial direction between the bottom plate and crowns of the gear teeth is constant in an angle-at-circumference area covered by the trough.

18. The gear unit according to claim 16, wherein the bottom plate includes tab sections extending in the radial direction, at which the side walls are screw-connected.

19. The gear unit according to claim 16, wherein one side wall has a marking at which a bore hole is placeable to lead through a screw of a screw connection.

20. The gear unit according to claim 16, wherein the opening and/or the channel is bounded by the bottom plate and the two side walls.

21. The gear unit according to claim 16, wherein the bottom plate and each side wall are in each instance formed in one piece and/or integrally.

22. The gear unit according to claim 16, wherein the housing top part has a support section on which wall sections are molded.

23. The gear unit according to claim 22, wherein the support section is formed integrally and/or in one piece with the wall sections, as a casting and/or a steel casting.

24. The gear unit according to claim 22, wherein a greatest wall thickness of the wall sections is less than a greatest wall thickness of the support section.

25. The gear unit according to claim 22, wherein the support section of the housing top part includes a first and a second transverse rib, the transverse ribs extending mainly in a horizontal direction and/or extending further in the horizontal direction than in any direction transverse to the horizontal direction, the support section having two first ribs, the two first ribs being set apart from each other and in each case being joined to the first transverse rib, at two points set apart from each other, the first ribs extending mainly in a vertical direction and/or extending further in the vertical direction than in any direction transverse to the vertical direction, two second ribs being set apart from each other and in each case being joined to the second transverse rib, at two points set apart from each other, the second ribs extending mainly in the vertical direction and/or extending further in the vertical direction than in any direction transverse to the vertical direction.

26. The gear unit according to claim 25, wherein each first rib and each second rib includes a lifting eye at an end area facing away from a respective transverse rib.

27. The gear unit according to claim 25, wherein at least one of the first ribs is joined at an end area to a bar and/or a support bar, which is joined at another end to the end area of at least one of the second ribs, the other first rib being joined at the end area to a bar and/or a support bar, which is joined at another end to the end area of the other second rib, the two bars being arranged in parallel and set apart from each other.

28. The gear unit according to claim 25, wherein a shaft of the gear unit is supported by a bearing in the housing, a first part of a bearing mounting being located in the housing top part and a second part of the bearing mounting being located in the housing bottom part, the first part of the bearing mounting including a thickened section and joined to an area of the transverse ribs at which the respective rib is also joined.

29. The gear unit according to claim 22, wherein a housing cover closes an opening in the housing top part, the opening being surrounded by the support section, with a clearance, so that the support section does not directly contact the opening and is set apart from the opening.

30. A gear unit, comprising:
a housing including a housing top part and a housing bottom part on which the housing top part is mounted, the housing top part being disposed on a first side of a plane and the housing bottom part being disposed on another side of the plane, the housing top part having a top wall and side walls at least partially delimiting an interior of the gear unit, at least one oil-guiding rib structure being disposed on the top wall, at least one rib section of a respective oil-guiding rib structure extending from an area of the top wall having a slight or vanishing slope with respect to the plane to an area of the top wall having a greater slope with respect to the plane in terms of actual amount, the housing top part including at least one longitudinal groove extending in a longitudinal direction of the gear unit along at least one of the side walls and along an entire longitudinal length of the interior of the gear unit delimited by the housing top part and at least one transverse groove extending in a transverse direction of the gear unit along at least one of the side walls and along an entire transverse length of the interior of the gear unit delimited by the housing top part, the transverse direction being transverse to the longitudinal direction, the oil-guiding rib structure adapted to guide oil to at least the longitudinal groove.

* * * * *